US007764394B2

(12) United States Patent
Omura

(10) Patent No.: US 7,764,394 B2
(45) Date of Patent: Jul. 27, 2010

(54) DATA PROCESSING APPARATUS, DATA PROCESSING METHOD, AND DATA PROCESSING PROGRAM

(75) Inventor: Hiroshi Omura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1366 days.

(21) Appl. No.: 10/731,119

(22) Filed: Dec. 10, 2003

(65) Prior Publication Data

US 2004/0130701 A1 Jul. 8, 2004

(30) Foreign Application Priority Data

Dec. 12, 2002 (JP) ............................ 2002-360343

(51) Int. Cl.
*G06F 15/00* (2006.01)

(52) U.S. Cl. .................... 358/1.18; 358/1.15; 358/1.16; 358/1.17; 707/999.006

(58) Field of Classification Search ................ 358/1.18, 358/1.15, 1.16, 1.17; 707/6, 999.006
See application file for complete search history.

(56) References Cited

U.S. PATENT DOCUMENTS

| | | | | |
|---|---|---|---|---|
| 4,849,821 | A * | 7/1989 | Allen et al. | 358/405 |
| 5,047,955 | A * | 9/1991 | Shope et al. | 358/1.12 |
| 5,532,839 | A * | 7/1996 | Beikirch et al. | 358/401 |
| 6,254,290 | B1 * | 7/2001 | Imai et al. | 400/76 |
| 6,293,714 | B2 | 9/2001 | Noda | 400/61 |
| 6,507,411 | B1 | 1/2003 | Nishikawa et al. | 358/1.2 |
| 6,671,066 | B1 | 12/2003 | Aikawa et al. | 358/1.18 |
| 6,833,930 | B2 | 12/2004 | Nishikawa et al. | 358/1.2 |
| 6,864,993 | B1 * | 3/2005 | Roberts et al. | 358/1.9 |
| 6,980,306 | B1 * | 12/2005 | Lapstun et al. | 358/1.12 |
| 7,218,413 | B2 | 5/2007 | Nishikawa et al. | 358/1.2 |
| 7,254,668 | B1 * | 8/2007 | Chang et al. | 711/103 |
| 2001/0002957 | A1 | 6/2001 | Noda | 400/61 |
| 2002/0122189 | A1 * | 9/2002 | Salgado | 358/1.6 |
| 2002/0186384 | A1 * | 12/2002 | Winston et al. | 358/1.5 |
| 2003/0016870 | A1 * | 1/2003 | Waida et al. | 382/218 |
| 2003/0030209 | A1 * | 2/2003 | Pickett | 271/298 |
| 2003/0053083 | A1 | 3/2003 | Nishikawa et al. | 358/1.2 |
| 2005/0052662 | A1 | 3/2005 | Nishikawa et al. | 358/1.2 |

FOREIGN PATENT DOCUMENTS

| | | |
|---|---|---|
| EP | 0971532 A2 | 1/2000 |
| EP | 1744538 | 1/2007 |
| EP | 0971532 B1 | 3/2007 |

(Continued)

*Primary Examiner*—David K Moore
*Assistant Examiner*—Mark R Milia
(74) *Attorney, Agent, or Firm*—Fitzpatrick, Cella, Harper & Scinto

(57) ABSTRACT

A printing result can be obtained with correct segment of a set unit in a collate document. When a printing mode in which a spool file manager 304 outputs a plurality of logical pages on one storage medium, drawing information among logical pages in a document is compared, and, when it is determined that the document is a collate document to be printed in plural set units, drawing information among logical pages in a document spooled in a spool file 303 is compared. Then, the number of pages indicating a segment of a set unit is detected, and a set-unit transfer process for drawing information on a printer 1500 is controlled depending on the segment of a set unit.

9 Claims, 16 Drawing Sheets

FOREIGN PATENT DOCUMENTS

| | | |
|---|---|---|
| JP | 11-065788 | 3/1999 |
| JP | 11-165455 | 6/1999 |
| JP | 2000-025277 | 1/2000 |
| JP | 2000-043362 | 2/2000 |
| JP | 2000-056942 | 2/2000 |

* cited by examiner

| |
|---|
| FIG. 8A |
| FIG. 8B |

| FIG. 10A |
|---|
| FIG. 10B |

MEMORY MAP OF STORAGE MEDIUM

DATA PROCESSING APPARATUS, DATA PROCESSING METHOD, AND DATA PROCESSING PROGRAM

BACKGROUND OF THE INVENTION

1. Field of the Invention

The present invention relates to a printing system particularly composed of a data processing apparatus such as a personal computer connected to a printer, and relates to the control of job processing of a data processing apparatus for collate-printing a document from an application in plural set units.

2. Related Background Art

FIG. 12 is a block diagram for explanation of a data processing system in a conventional printing system. For example, the method of connecting a printing device 1500 such as a printer, etc. to a host computer 3000 directly through an I/I is substantially the same as the method of connecting a printing system through a network.

In FIG. 12, an application 201, a graphic engine 202, a printer driver 203, and a system spooler 204 are program modules loaded into RAM and executed by a module which uses an OS and its modules when they are provided as files stored in external memory. The application 201 and the printer driver 203 can be added to the FD of external memory, CD/ROM not shown in the attached drawings, or the HD of the external disk through a network not shown in the attached drawings.

The application 201 stored in external memory is loaded into the RAM and executed. When a printing process is performed on the printing device 1500 from the application 201, printing data is output (drawn) using the graphic engine 202 which is also loaded into the RAM and executable.

The graphic engine 202 loads the printer driver 203 provided for each printing device from external memory to the RAM, and the output of the application 201 is set in the printer driver 203.

A GDI (graphic device interface) function received from the application 201 is converted into a DDI (device driver interface) function, and the DDI function is output to the printer driver 203. The printer driver 203 converts the DDI function received from the graphic engine 202 into a control command recognizable by a printer, for example, a PDL (page description language). The converted printer control command is output as printing data to the printing device 1500 through the system spooler 204 loaded into the RAM by the OS, and also through the interface 21.

A printing process requested by a user is called a job. A document which a user requests to print is normally formed by one or more pages. The drawing information about the configuration of a page is referred to as a logical page. On a printing device, the following functions can be applied to a printing result of a logical page.

Duplex printing capability is the function of printing logical pages forming a document which a user requests to print by assigning each logical page to one of obverse and reverse pages of one physical page.

N-up printing capability is the function of printing two or more logical pages simultaneously arranged on one physical page.

A printing result on one storage medium using the above-mentioned function is referred to as a physical page. One job is normally formed by one or more physical pages.

In the explanation below, notations 1 to 5 are used to express the relationship between a logical page forming a display which a user requests to print, a physical page which is a printing result, and a job.

Notation 1

The contents of a logical page to be printed are expressed by a numeral or a variable.

For example, the first logical page →1, the second logical page →2, and the N-th logical page →N are expressed.

Notation 2

One side of a printed physical page is expressed by enclosure with ( ) and ".

For example, when the first page is printed as a physical page, it is express by →(1), and when the first and second pages are N-up-printed, it is expressed by →(1, 2).

Notation 3

The reverse page of a printed physical page is expressed by adding ".

For example, when the second page is printed as a reverse page, it is expressed by →(2)".

Notation 4

A printed physical page is expressed by enclosure with < and >.

For example, when the first page is printed as a face and the second page is printed as a reverse, the physical page is expressed by →<(1), (2)">.

Notation 5

A job is expressed by enclosure with [ ], ", and pages are arranged in an ascending order.

For example, a simplex printing job on a document formed by three logical pages is expressed by →[<1>, <2>, <3>], a 2-up simplex printing job on a document formed by three logical pages is expressed by →[(1, 2)>, <3>], and a 2-up duplex printing job on a document formed by three logical pages is expressed by →[(1, 2)>, <3>"].

When a document is printed in plural set units, it can be printed in 2 set units or can be twice printed continuously. The plural set printing in set units is called collate-printing.

For example, in the 2-set printing of a document formed by three logical pages, collate OFF→[<(1)>, <(1)>, <(2)>, <(2)>, <(3)>, <(3)>] and collate ON→[<(1)>, <(2)>, <(3)>, <(1)>, <(2)>, <(3)>] are expressed.

To realize the above-mentioned collate-printing on a printing system, it is necessary to temporarily store all logical pages forming a document, and regenerate them in set units. Some printing systems do not include storage means for storing a document for realizing the collate-printing.

Therefore, in some applications, the collate-printing can be specified using a user interface (UI) of an application by printing a document plural times in set units, thereby realizing the printing.

FIGS. 13 to 15 show an example of collate-printing for a job in the printing system, and an example of an application for printing a document plural times.

FIG. 13 shows the configuration of a logical page of a job, and FIG. 14 shows an example of a two-unit collate-printing in an application for a document formed by three logical pages shown in FIG. 13. FIG. 15 shows an example of 2-unit collate-printing in an application for a document formed by three logical pages, and duplex printing on a printing device.

In the case of collate ON→[<(1)>, <(2)>, <(3)>, <(1)>, <(2)>, <(3)>], no segment of a set unit is detected in the collate-printing on the printing system according to the above-mentioned application. Therefore, if the function of printing a plurality of logical pages on one page in the duplex printing, N-up printing, etc. is used, an unexpected printing result is output as follows.

That is, when a document formed by three logical pages is printed in the 2-unit collate-printing in an application and in the duplex printing on a printing device, the result indicated by the jobs 9-2 and 9-3 shown in FIG. 14 is output.

The user-requested job 9-2 shown in FIG. 14 is [<(1), (2)">, <(3)>, <(1), (2)">, <(3)>], but the output result shown by the job 9-3 in the above-mentioned application is expressed by [<(1), (2)">, <(3), (1)">, <(2), (3)">].

Additionally, for example, when the document formed by three logical pages is printed in the 2-unit collate-printing by an application and in the 4-up printing on a printing device, the user-requested job 9-4 shown in FIG. 15 is [<(1, 2, 3)>, <(1, 2, 3)>]. However, in the above-mentioned application, the output result of the job 9-5 is expressed by [<(1, 2, 3, 1)>, <(2, 3)>].

As described above, in the conventional printing system, a segment of a set unit cannot be detected when an application continuously prints a document in set units, and uniquely prints with the number of sets specified for collate-printing.

Therefore, when the function of printing a plurality of logical pages on one output medium of N-up printing, duplex printing, etc. is applied on this document, a segment of a set unit cannot be detected, thereby resulting in an unexpected printing result (refer to the job 9-3 shown in FIG. 14 or the job 9-5 shown in FIG. 15).

SUMMARY OF THE INVENTION

The present invention has been developed to solve the above-mentioned problems, and aims at providing a data processing apparatus for transferring to a printing device a document formed by a plurality of logical pages generated by an application, and allowing the printing device to perform a set-unit printing process in which when a printing mode for output of a plurality of logical pages to one storage medium is specified, drawing information among logical pages of a spooled document is compared with each other, and it is determined whether or not the document is a collate document to be printed in plural set units. When it is determined that the document is a collate document, the drawing information among logical pages in the spooled document is compared with each other, the number of pages is detected as a segment of a set unit, and a set-unit transfer process on drawing information is controlled on the printing device depending on the detected segment of a set unit. Thus, although a printing mode for output of a plurality of logical pages to a storage medium is specified in response to a collate-printing request from an application, a segment of a set unit in a collate document can be correctly detected and a desired printing result can be efficiently obtained, thereby realizing a data processing apparatus capable of generating an inexpensive job processing environment.

To attain the above-mentioned purpose, the data processing apparatus according to the present invention has the following configuration.

The present invention is a data processing apparatus for transferring to a printing device a document formed by a plurality of logical pages, and allowing the printing device to perform a printing process in set units. The apparatus includes: spooling means (for example, a spooler 302 and a spool file 303 shown in FIG. 4) for spooling the document; designation means (for example, an application 201 shown in FIG. 4) for designating a printing mode for output of a plurality of logical pages to one storage medium; collate determination means (for example, a spool file manager 304 shown in FIG. 4) for determining whether or not the document is a collate document to be printed in plural set units by comparing drawing information among the logical pages of the document spooled in the spooling means when the designation means designates the printing mode; detection means for comparing drawing information among logical pages in the spooled document when the collate determination means determines that the document is a collate document, and detecting the number of pages as a segment of a set unit; and control means (for example, a printer driver 203 shown in FIG. 4) for controlling a set-unit transfer process on drawing information for the printing device depending on the segment of a set unit detected by the detection means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Before explaining the embodiments of the present inventions, the configuration of the engine of a printing device to which the present invention can be applied is first described below.

First Embodiment

Figure 1:
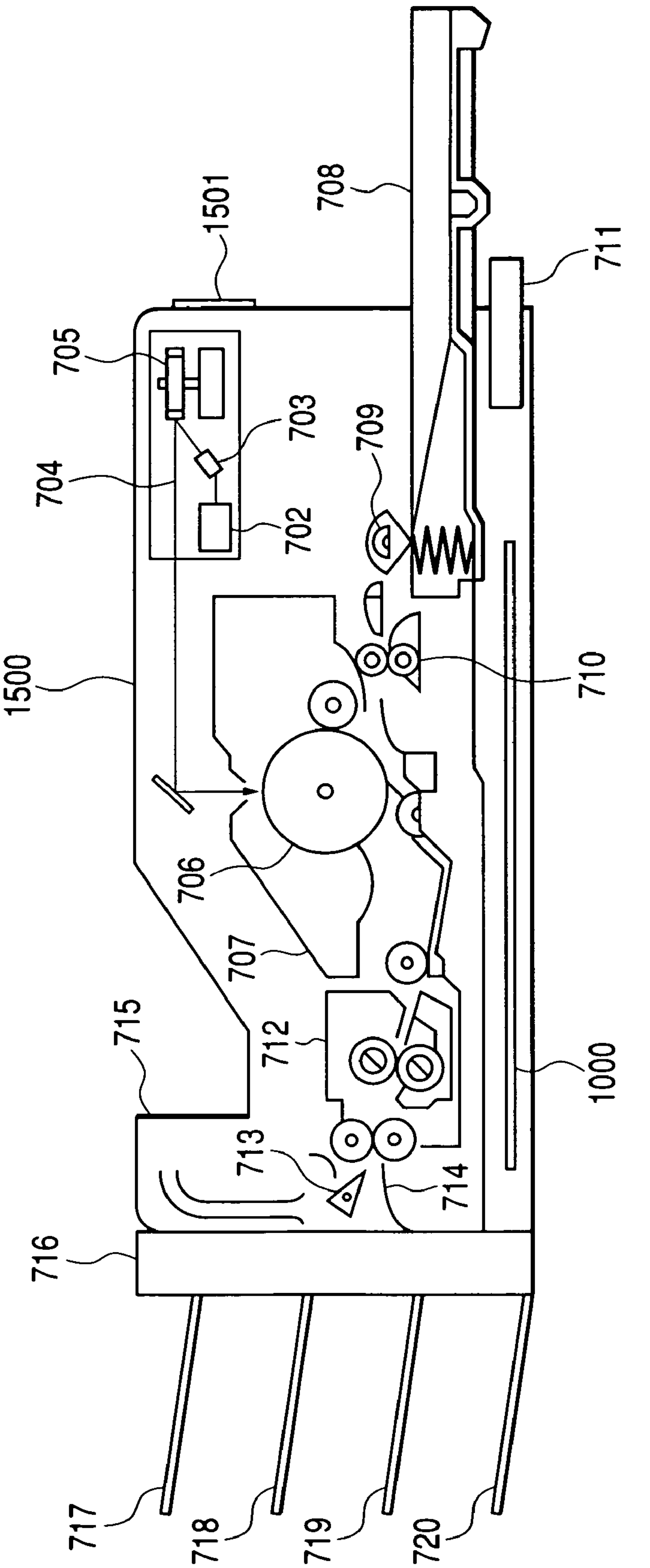
FIG. 1 shows the outline of a sectional view for explanation of the configuration of a printing device which can communicate with the data processing apparatus according to the present invention.

FIG. 1 shows the outline of a sectional view for explanation of the configuration of a printing device which can communicate with the data processing apparatus according to the present invention, and corresponds to the case of a laser beam printer 1500 for inputting, for example, character pattern data, etc., for printing on recording paper.

The printer 1500 comprises the main system of the LBP for forming an image on recording paper which is a storage medium at a received printer control command, etc., a printer control unit 1000, an operation unit 1501, a laser driver 702, a semiconductor laser 703, a rotary polygon mirror 705, a electrostatic drum 706, a developing unit 707, a paper cassette 708, a carrier roller 710, external memory 711, a face-down ejection unit 715, an ejection sorter 716, and ejection bins 717 to 720.

The configuration of the above-mentioned components is described in detail with their operations below. That is, the printer control unit 1000 controls the entire LBP and analyzes the character pattern information, etc., and mainly converts a printer control command into a video signal, and outputs the result to the laser driver 702. The external memory 711 for providing font data, an emulation program, etc. of a page description language can also be connected to the printer control unit 1000. An operation unit 1501 is provided with a switch, display means (for example, an LED indicator), etc. for the operation described above.

The laser driver 702 is a circuit for driving the semiconductor laser 703, and switches ON and OFF a laser beam 704 emitted from the semiconductor laser 703 according to the input video signal. The semiconductor laser 703 emits a laser beam toward the rotary polygon mirror 705. The rotary polygon mirror 705 horizontally disperses the laser beam 704, and scans the electrostatic drum 706. The electrostatic drum 706 forms an electrostatic latent image of a character pattern on the surface of the drum by the scanning operation using the laser beam 704.

The developing unit 707 is provided around the electrostatic drum 706, and develops an electrostatic latent image. After the development, the image is transferred onto recording paper. The paper cassette 708 stores recording paper such as cut sheets. A paper feed roller 709 and the carrier roller 710 feed the cut recording sheets in the paper cassette 708 into the body of the LBP, and supply them to the electrostatic drum 706. In this case, the cut recording sheets can also be fed from the manual feed tray (not shown in the attached drawings) mounted on the upper surface of the cover of the paper cassette 708.

A fixing unit 712 heats a toner image transferred to the cut recording sheet, and fixes it onto the cut recording sheet. The image formed recording paper is ejected to an ejection sorter 716 from a face-up ejection unit 714 with the recording surface facing upward when a switch wedge 713 faces upward, and is ejected with the recording surface facing downward from a face-down ejection unit 715 when the switch wedge 713 faces downward.

At an instruction of the printer control unit 1000, the ejection sorter 716 controls the face-up/down, and ejects recording paper to the ejection bins 717 to 720.

Figure 2:
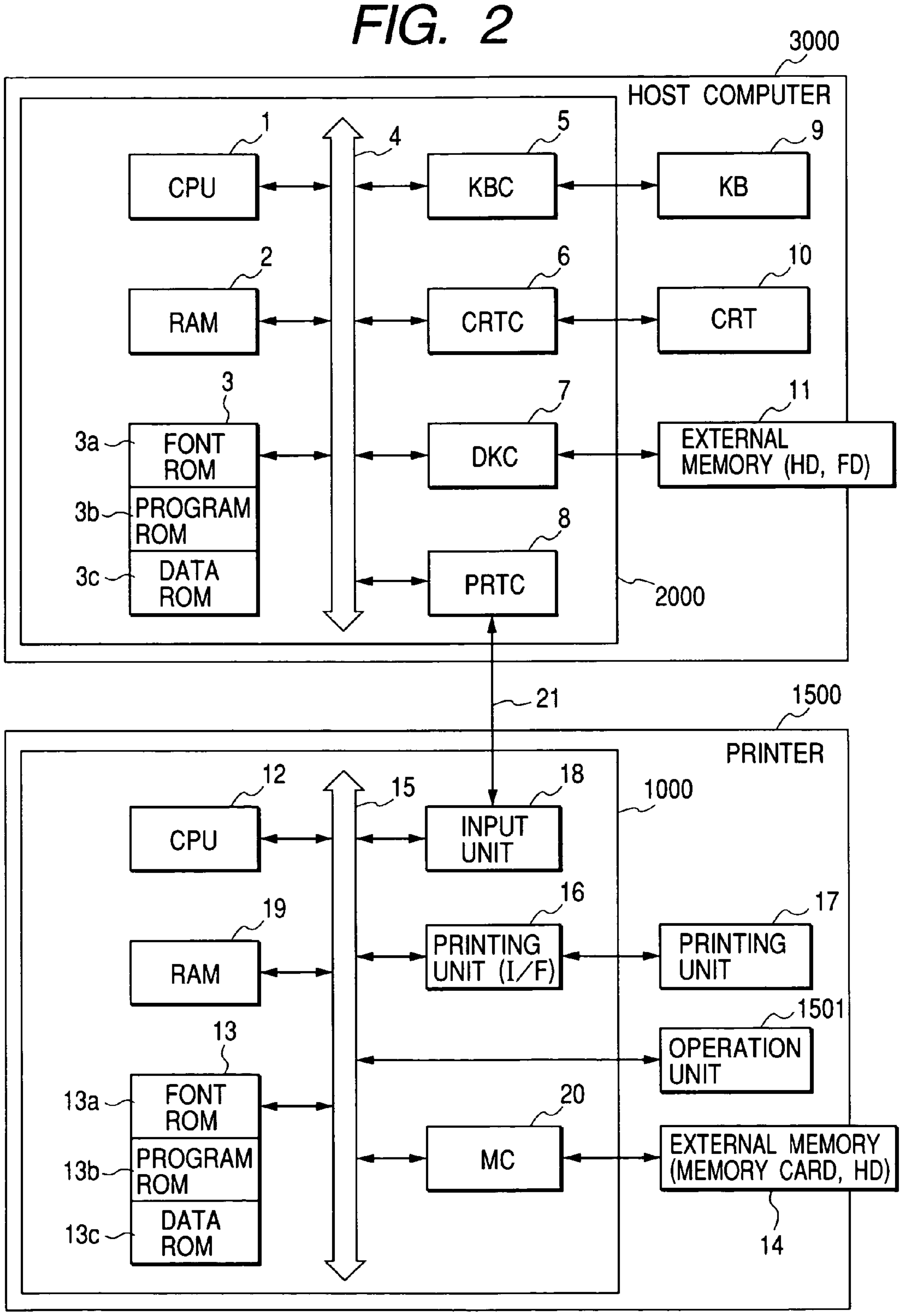
FIG. 2 is a block diagram for explanation of the configuration of the printer control system according to the first embodiment of the present invention.

FIG. 2 is a block diagram for explanation of the configuration of the printer control system according to the first embodiment of the present invention. If the function of the present invention can be executed, any system can be operated using the present invention regardless of a single unit of equipment, a system comprising plural pieces of equipment, a system which is connected through a network such as a LAN (Local Area Network), a WAN (Wide Area Network), etc.

The printer control system according to the first embodiment is configured by a host computer 3000 and a printer 1500.

The host computer 3000 comprises a CPU 1, RAM 2, ROM 3, a keyboard controller (KBC) 5, a CRT controller (CRTC) 6, a disk controller (DKC) 7, a printer controller (PRTC) 8, a keyboard (KB) 9, a CRT display (CRT) 10, and external memory 11.

First, the configuration of each component of the host computer 3000 is described below in detail. That is, the CPU 1 is a central processing device for generally controlling each device connected through a system bus 4, and performs document processing including graphics, images, characters, tables (including spreadsheet, etc.), etc. according to program ROM 3*b* (described later) of the ROM 3, the document processing program, etc. stored in the external memory 11.

The CPU 1 also performs a rasterizing process of the outline font in the display information RAM set in the RAM 2, and enables WYSIWYG (what you see is what you get: the function of printing an image in size and shape displayed on the CRT display screen).

Furthermore, the CPU 1 opens various windows recorded based on the command indicated by a mouse cursor (not shown in the attached drawings), etc. on the CRT display 10, and performs various data processing. When a user performs a printing process on the printer 1500, he or she opens a window for the settings required in the printing process, sets the printer 1500, and sets the printing process method required for a printer driver including the settings of the printer 1500 and the selection of the printing mode.

The RAM 2 functions as the main memory, a work area, etc. of the CPU 1. The ROM 3 is provided with font ROM 3*a*, the program ROM 3*b*, and data ROM 3*c*. The font ROM 3*a* or the external memory 11 stores font data for use in performing the above-mentioned document processing. The program ROM 3*b* or the external memory 11 stores an operating system (hereinafter referred to as an OS), etc. which is a control program of the CPU 1. The data ROM 3*c* or the external memory 11 stores various data for use in performing the above-mentioned document processing, etc.

The keyboard controller (KBC) 5 controls key input from the keyboard (KB) 9 and a pointing device (not shown in the attached drawings). The CRT controller (CRTC) 6 controls the display of the CRT display (CRT) 10. The disk controller (DKC) 7 controls the access to the external memory 11. The printer controller (PRTC) 8 is connected to the printer 1500 through a bidirectional interface 21, and performs a communications control process with the printer 1500. The keyboard (KB) 9 is provided with various keys.

The CRT display (CRT) 10 displays graphics, image characters, tables, etc. The external memory 11 comprises a hard disk (HD), a flexible disk (FD), etc., and stores a boot program, various applications, font data, user files, edit files, printer control command generation program (hereinafter referred to as a printer driver), etc.

The above-mentioned CPU 1, the RAM 2, the ROM 3, the keyboard controller (KBC) 5, the CRT controller (CRTC) 6, the disk controller (DKC) 7, and the printer controller (PRTC) 8 are provided on a computer control unit 2000.

Then, the configuration of the printer 1500 is described below in detail. A CPU 12 is a central processing device for generally controlling each device connected to the system bus 15, and outputs an image signal as output information to a printing unit (printer engine) 17 according to the control program, etc. stored in the program ROM 13*b* (described later) of the ROM 13, or the control program stored in external memory 14. The CPU 12 can communicate with the host computer 3000 through an input unit 18, and the information in the printer 1500, etc. can be given to the host computer 3000.

RAM 19 functions as main memory of CPU 12, a work area, etc., and is designed such that the memory capacity can be extended by optional RAM (not shown in the attached drawings) connected to an expansion port.

RAM 19 is used for an output information rasterizing area, an environment data storage area, NVRAM, etc. The ROM 13 comprises font ROM 13*a*, program ROM 13*b*, and data ROM 13*c*. The font ROM 13*a* stores font data, etc. for use in generating the above-mentioned output information. The program ROM 13*b* stores control program, etc. The data ROM 13*c* stores information, etc. for use in the host computer 3000 when the external memory 14 such as a hard disk, etc. is not connected to the printer 1500.

The input unit 18 communicates data between the printer 1500 and the host computer 3000 through the bidirectional interface (I/F) 21. A printing unit interface (I/F) 16 communicates data between the CPU 12 and the printing unit 17. A memory controller (MC) 20 controls the access to the external memory 14. The printing unit 17 performs a printing operation based on the control of the CPU 12. The operation unit 1501 is provided with a switch, display means (for example, an LED indicator), etc. for various operations.

The external memory 14 is formed by a hard disk (HD), an IC card, etc., and is optionally connected to the printer 1500. The external memory 14 stores font data, an emulation program, form data, etc., and the access to the memory is controlled by the memory controller (MC) 20. If the capacity of the memory is large, it is used as spool storage means for a job on a printing device. The external memory 14 is not limited to one unit, but a plurality of memory units can be prepared. That is, in addition to a built-in font, plural units of external memory storing an option card and a program for interpretation of printer control languages different in language system can be connected. Furthermore, NVRAM (not shown in the attached drawings) can be included to store printer mode setting information from the operation unit 1501.

The above-mentioned CPU 12, RAM 19, ROM 13, input unit 18, printing unit interface (I/F) 16, and memory controller (MC) 20 are arranged in the printer control unit 1000.

Figure 3:
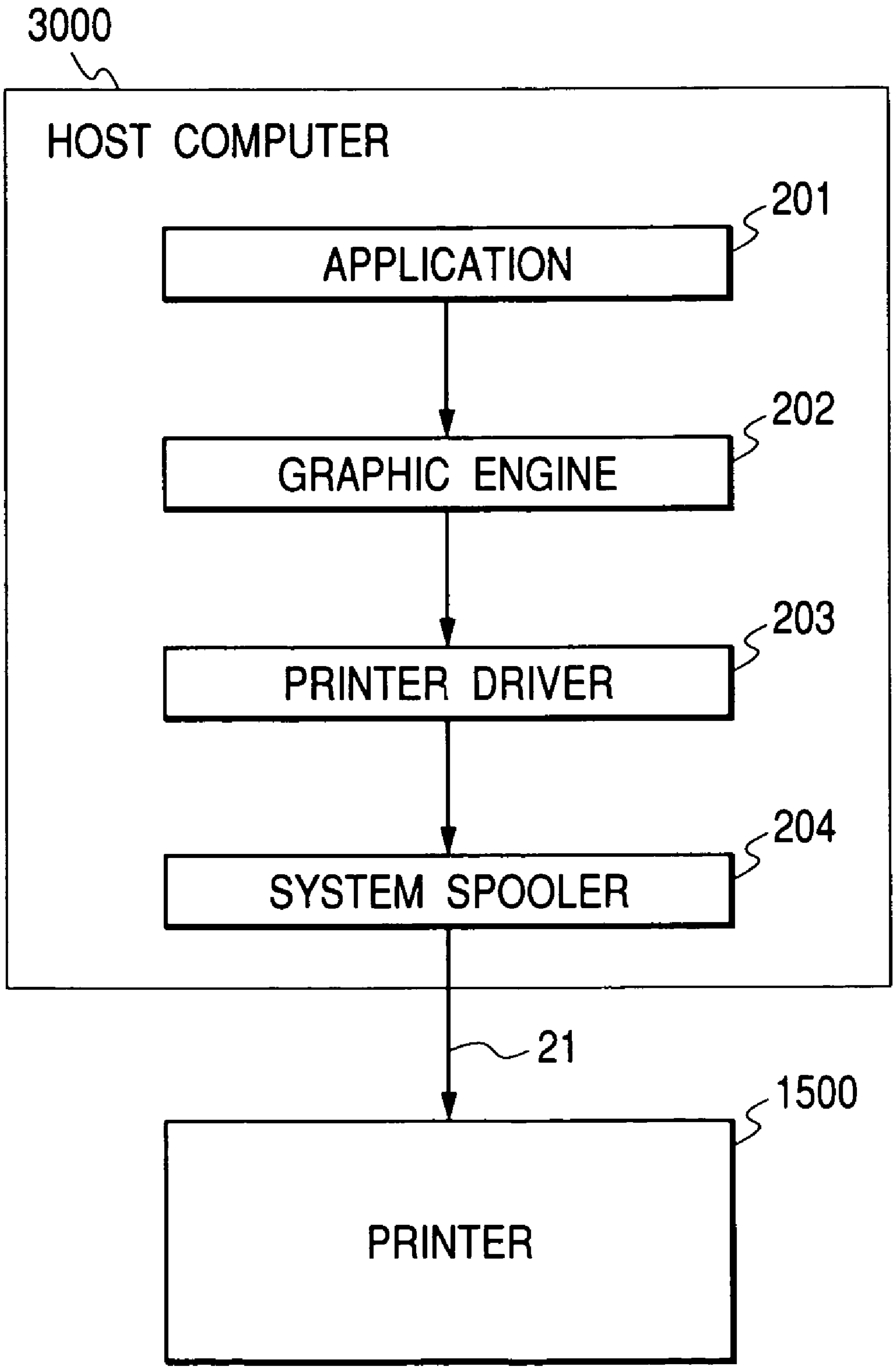
FIG. 3 is a block diagram for explanation of the configuration of the first data processing module of the host computer in the printing control system shown in FIG. 2.

FIG. 3 is a block diagram for explanation of the configuration of the first data processing module of the host computer 3000 in the printing control system shown in FIG. 2. Although the printing device such as the printer 1500, etc. is directly connected through the I/F 21, the host computer 3000 can be connected through a network. The same component as that shown in FIG. 2 is assigned the same reference numeral.

In FIG. 3, an application 201, a graphic engine 202, a printer driver 203, and a system spooler 204 are program modules loaded into RAM 2 and executed by a module which uses an OS and its modules when they are provided as files stored in the external memory 11 in the above FIG. 1 and executed.

The application 201 and the printer driver 203 can be added to the HD of the external memory 11 through the FD or CD/ROM of the external memory 11 or through a network (not shown in the attached drawings). The application 201 stored in external memory 11 is loaded into the RAM 2 and executed. When a printing process is performed on the printing device 1500 from the application 201, printing data is output (drawn) using the graphic engine 202 which is also loaded into the RAM 2 and executable.

The graphic engine 202 loads the printer driver 203 provided for each printing device (printer) from the external memory 11 to the RAM 2, and the output of the application 201 is converted into a control command of the printer a printer driver 203. The converted printer control command is output by the OS to the printer 1500 through the system spooler 204 loaded into the RAM 2 by way of the interface 21.

Figure 4:
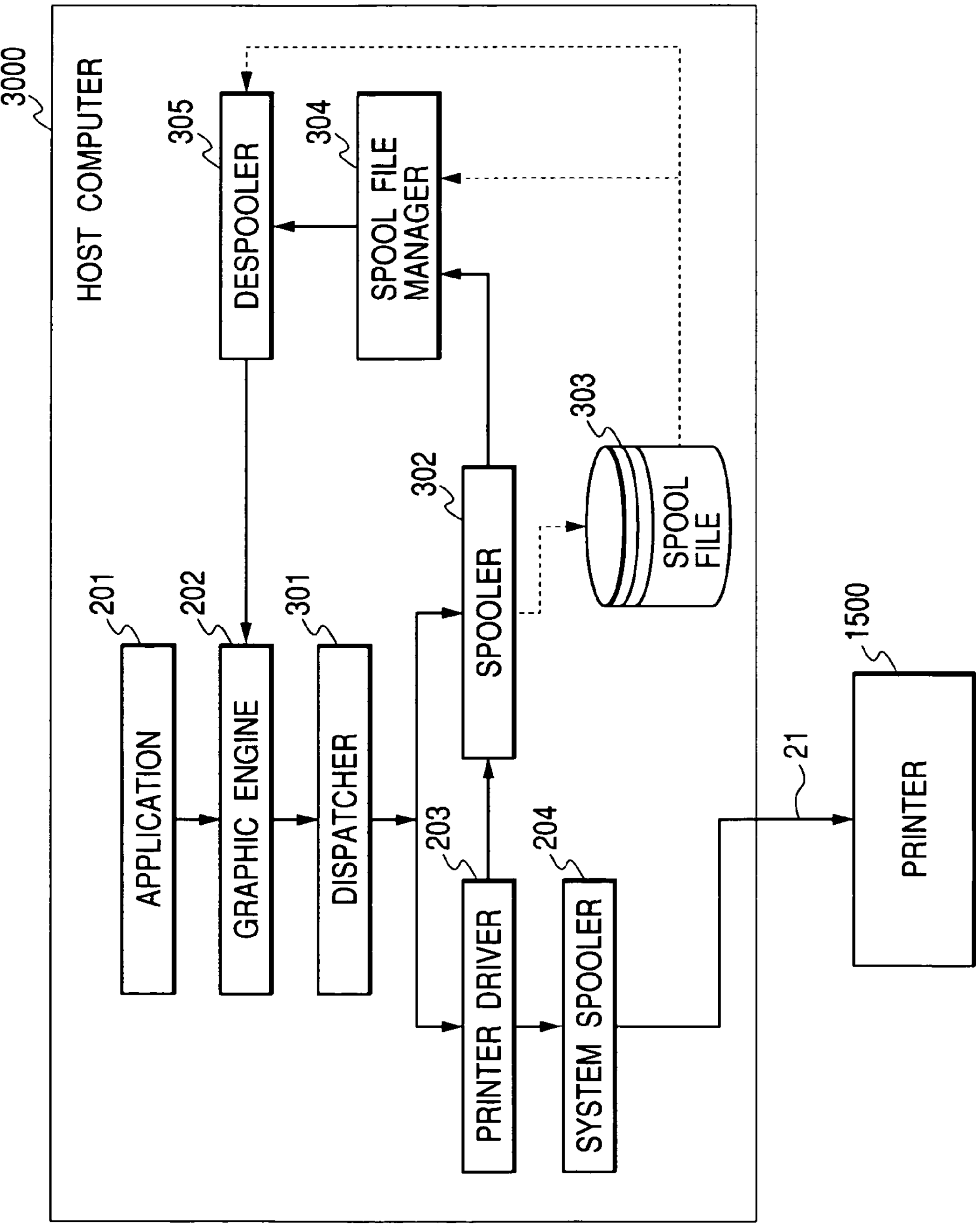
FIG. 4 is a block diagram for explanation of the configuration of the second data processing module of the host computer in the printing control system shown in FIG. 2.

The printer control system according to the first embodiment of the present invention has the configuration of temporarily spooling the printing data from an application as intermediate code data as shown in FIG. 4 in addition to the printing system comprising the printer 1500 and the host computer 3000 as shown in FIGS. 1 and 2.

In this example, the intermediate code data is used, but a print command indicating the drawn portion for the page as the format of the intermediate code can be also used.

FIG. 4 is a block diagram for explanation of the configuration of the second data processing module of the host computer 3000 in the printing control system shown in FIG. 2, and shows an expanded printer control system shown in FIG. 3. With the configuration, the spool file 303 temporarily expressed in an intermediate code can be generated each time a print instruction is transmitted from the graphic engine 202 to the printer driver 203.

In the system shown in FIG. 2, the application 201 is released from the printing process when the printer drive 203 has completely converted all print instructions from the graphic engine 202 into control commands of the printer 1500.

On the other hand, in the print control system shown in FIG. 4, the application 201 can be released from the set-unit printing process only after the spooler 302 has completely converted all print instruction into intermediate code data, and output the result to the spool file 303. Normally, the latter requires a shorter time.

In the system shown in FIG. 3, the contents of the spool file 303 can be processed. Thus, printing data from an application can be enlarged/reduced, and a function such as the N-up printing in which a plurality of pages can be printed in predetermined positions on one page, etc. can be realized beyond the application.

To attain the above-mentioned purpose, the system shown in FIG. 3 has been enlarged such that the intermediate code data can be spooled as shown in FIG. 4. To process printing data, the settings are made in the window provided by the printer driver 203 and the printer driver 203 stores the set contents in the RAM 2 or the external memory 11.

The configuration shown in FIG. 4 is described below in detail. As shown in FIG. 4, in the expanded processing system, a print instruction from the graphic engine 202 is received by a dispatcher 301. If the print instruction received by the dispatcher 301 from the graphic engine 202 has been issued from the application 201 to the graphic engine 202, then the dispatcher 301 load the spooler 302 stored in the external memory 11 into the RAM 2, and transmits the print instruction to the spooler 302, not to the printer driver 203.

The spooler 302 converts the received print instruction into an intermediate code and outputs the result to the spool file 303. The spooler 302 obtains the process settings about the printing data set for the printer driver 203 from the printer driver 203, and stores it in the spool file 303.

The spool file 303 generates a file in the external memory 11, but it can be generated in the RAM 2. Additionally, the spooler 302 can loads the spool file manager 304 stored in the external memory 11 into the RAM 2, and notifies the spool file manager 304 of the generation status of the spool file 303.

Then, the spool file manager 304 determines whether or not a printing process can be performed using the graphic engine 202 according to the contents of the process settings about the printing data stored in the spool file 303.

If the spool file manager 304 determines that the printing process can be performed using the graphic engine 202, then a despooler 305 stored in the external memory 11 is loaded into the RAM 2, and the despooler 305 is instructed to perform a printing process on the intermediate code described in the spool file 303.

The despooler 305 processes the intermediate code contained in the spool file 303 according to the contents of the process settings contained in the spool file 303, and outputs the result through the graphic engine 202 again.

If the print instruction received by the dispatcher 301 from the graphic engine 202 is a print instruction issued from the despooler 305 to the graphic engine 202, then the dispatcher 301 transmits a print instruction to the printer driver 203, not to the spooler 302. The printer driver 203 generates a printer control command, and outputs it to the printer 1500 through the system spooler 204.

Figure 5:
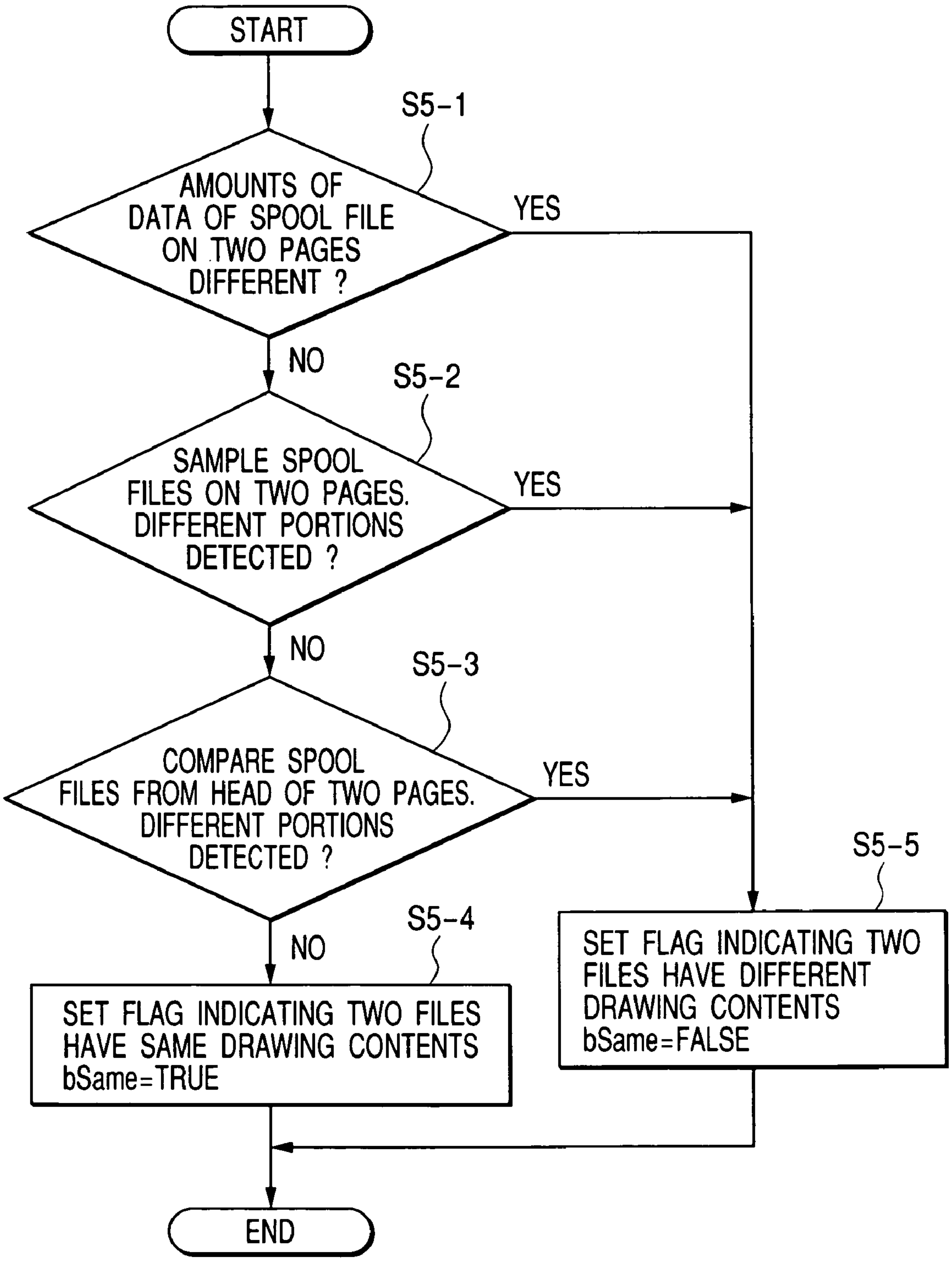
FIG. 5 is a flowchart of an example of the first data processing procedure by a printing control system according to the present invention.

FIG. 5 is a flowchart showing an example of the first data process procedure in the printer control system according to the present invention, and corresponds to the collate document determination process procedure by the spool file manager 304 shown in FIG. 4. Steps 5-1 to step 5-5 show the respective process steps.

In the present embodiment, the process of comparing two pages used in the collate document description process and determining whether or not they have the same contents is described. It is assumed that the format of the intermediate code used in the following comparison indicates the same contents when the same page contents are described.

When the amounts of the data of the spool files 303 between two pages are compared and the drawing contents of the pages are the same, the same amounts of the data are required conditions. Therefore, a more detailed comparison is made in step 5-2. If the amounts of data are different, the two pages do not have the same drawing contents, and control is passed to step 5-5.

In step 5-2, a part of the spooled drawing data on two pages is sampled and compared between the pages. For example, a few leading, intermediate, and tailing bytes are compared between the pages. If the compared two bytes are different from each other, the two pages do not contain the same drawing contents, and control is passed to step 5-5.

On the other hand, if the comparison outputs the same results in step 5-2, then control is passed to step 5-3 to make further precise comparison. The spooled drawing data are compared from the heads on the two pages, and it is determined whether or not different portions are detected during the comparison. If there is any different portion detected, control is immediately passed to step 5-5.

On the other hand, if it is determined in step 5-3 that the same drawing data is detected to the end of the data, then control is passed to step 5-4, a flag bSame indicating that the two intermediate files have the same drawing contents is set as "TRUE" (bSame=TRUE), thereby terminating the process.

If it is determined "YES" in steps 5-1 to 5-3, then a flag bSame indicating that the two intermediate file have the same drawing contents is set as "FALSE" (bSame=FALSE) in step 5-5, thereby terminating the process.

If the spool format in which the drawing contents on one page are recorded contains an additional information such as a spooling order, etc. and the header or the end data of an additional drawing such as a page number, etc. in the above-mentioned process, then the portions are excluded in the comparison above.

If the same ID is indicated in the spool format, the description of the ID in the cache data over pages can be allowed.

However, the data to be cached as the first cache record data is described in the spool file, the same page can be recognized as containing different spooled contents. Therefore, data to be cached is not to be described in intermediate code.

Furthermore, when the same page data is not recognized although the same page contents are described, a semantic analysis of a drawing is carried out, and a determination is made as to whether or not the same page has been detected. In this case, the process requires a heavier load than the process of comparing and determining the contents of two pages.

Figure 6:
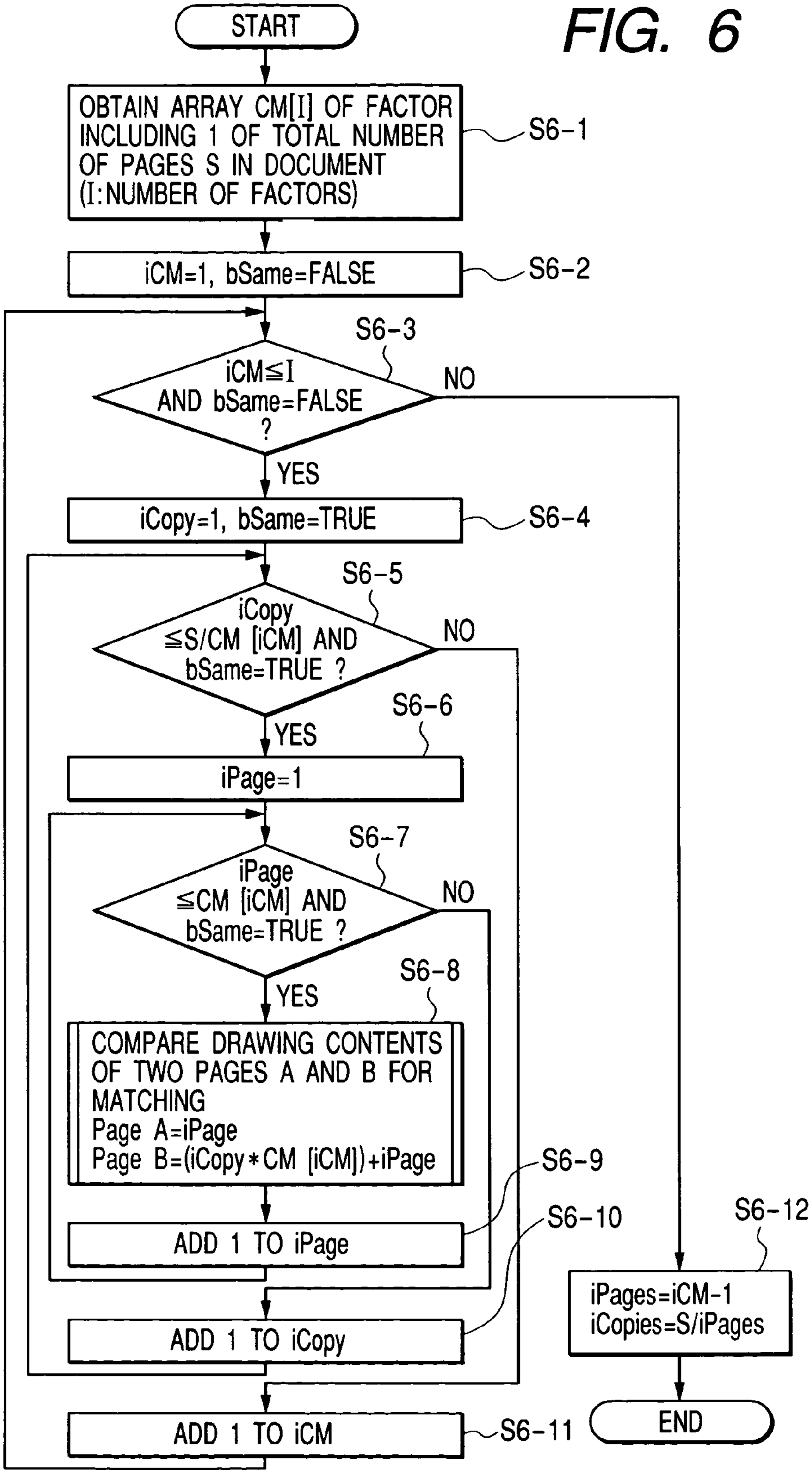
FIG. 6 is a flowchart of an example of the second data processing procedure by a printing control system according to the present invention.

FIG. 6 is a flowchart of an example of the second data processing procedure by a printing control system according to the present invention, and corresponds to the collate document determination process procedure by the spool file manager 304 shown in FIG. 4. Step 6 to 6-12 are the respective process steps. The following comparing process is an example of reducing the number of pages to be compared by recognizing the number of pages forming a set of a collate document as one of the factors including "1" of the total number of pages forming the document.

First, in step 6-1, an array CM (I) of factors of the number of pages S forming a document is generated. I indicates the number of factors of S. The array of factors includes "1" and arranged in an ascending order. Therefore, the CM (1) which is the leader of the factors is constantly "1".

Then, in step 6-2, the variable iCM indicating the number of the array CM ( ) of the factor being currently checked is substituted by the initial value of "1". The flag bSame indicating a collate document is initialized to "FALSE".

In step 6-3, to repeat the process up to the end of the factor group stored in the array of factors, a comparison iCM≦I is made to confirm whether or not the check has been made up to the last factor. The value iCM is counted in step 6-11. When the flag bSame is "TRUE", a collate document is determined in set units each having factor pages of CM (iCM−1), and control is passed to step 6-12 at the point.

Then, in step 6-4, control is passed to a factor unit, and the initial value of "1" is substituted for the variable iCopy indicating the set number, and the flag bSame is initialized to "TRUE". Thus, if the two checked pages have the same drawing contents in the lower hierarchical loop, control exits the check loop.

Then, in step 6-5, the variable iCopy is changed from "1" to S/CM (iCM), and the process is repeated to compare and check whether or not the same page can be detected in each set. The variable iCopy is added in step 6-10.

If it is determined that the document is a collate document, the number of set forming a collate document is expressed by S/CM (iCM). When the flag bSame indicates "FALSE", then it is not necessary to continue the check, and control exits to the upper hierarchical loop.

Then, in step 6-6, the variable iPage indicating the number of pages in the set to be compared is initialized to "1". In step 6-7, iPage is changed from "1" to CM (iCM), and the process is repeated to compare data to check whether or not the pages in the set are the same in the set. iPage is added in step 6-9. If the flag bSame indicates "FALSE", it is not necessary to continue the check, and control exits to the upper hierarchical loop.

Then, in step 6-8, a determination process is performed to check whether or not the two pages explained by referring to FIG. 5 have the same contents. A comparison is made between Page A (the iPage-th page in the document) and Page B (the (iCopy*CM(iCM)+iPage-th page). Then, if the same pages are detected after comparing Y, "TRUE" is set in the flag bSame. If different drawing contents are detected in the pages, the flag bSame is set as "FALSE".

Then, in step 6-9, the pages of the set corresponding to step 6-7 are counted in the iteration process, and control is returned to step 6-7.

In step 6-10, the pages of the set in the document corresponding to step 6-5 are counted in the iteration process, and control is returned to step 6-5.

Then, in step 6-11, the factors of the total number of pages of the document corresponding to step 6-3 are counted in the iteration process, and control is returned to step 6-3.

Then, in step 6-12, the number of pages iPages=iCM−1 in a set and the number of copies iCopies=S/iPages are counted when a collate document is processed.

PRACTICAL EXAMPLE 1

As a practical example 1, an example of applying the present invention when spooling means is not included in a job on a printing device is described below.

In the case of the practical example, when a printing device receives a print command of one page, data is printed in set units. Each time a copy is made, it is assigned to a plurality of ejection bins 717 to 720 for each set, and recording paper is ejected, thereby realizing the collate-printing.

In this case, since the collate-printing is mechanically performed using ejection bins, it is necessary to issue a collate set number designate command from the information processing device to the printing device before the print command for drawing in the pages is passed to the printing device.

Figure 7:
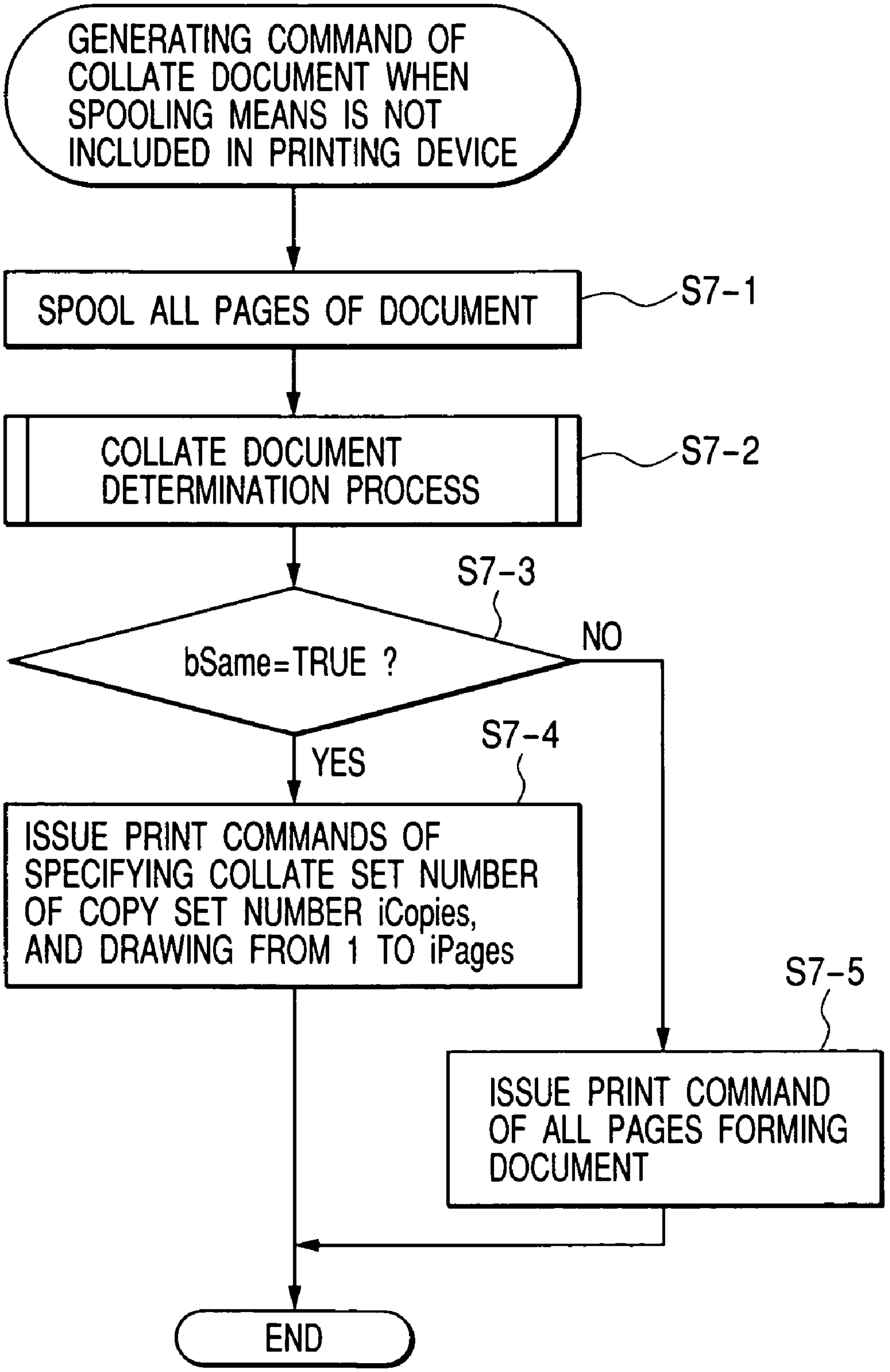
FIG. 7 is a flowchart of an example of the third data processing procedure by a printing control system according to the present invention.

FIG. 7 is a flowchart of an example of the third data processing procedure by a printing control system according to the present invention, and corresponds to the collate document command generation process procedure when no spooling means is included in the job on the printing device. Steps 7-1 to 7-5 indicates the respective process steps.

First, in step 7-1, all page contents of a document are spooled in the information processing device. Then, in step 7-2, the collate document determination process shown in FIG. 6 is performed.

Then, in step 7-3, it is determined whether or not the document is a collate document by referring to the contents of the variable (flag) bSame. If it is determined that the flag bSame is "TRUE", then control is passed to step 7-4. If the flag bSame is "FALSE", then control is passed to step 7-5.

Since it is determined in step 7-4 that the document is a collate document, a collate set number designation print command of a variable iCopy indicating the number of sets of copies and a print command for page drawing from 1 page to variable iPages in the spooled intermediate data are issued, thereby terminating the process.

On the other hand, in step 7-5, a printing device for drawing of all pages forming a document is issued using the spooled intermediate data, thereby terminating the process.

In the process above, since only a print command of a page forming one set of collate document according to the application 201 is transmitted to a printing device (printer 1500), the function of adapting a plurality of logical pages specified by the user to one output paper can be realized on the printing device in the style intended by the user.

When the information processing device performs N-up printing which is an example of the above-mentioned function, the processes up to step 7-3 are performed, and then the intermediate data of the page information forming one set of a collate document is processed as a print command forming a page from a plurality of logical pages in the information processing device, thereby realizing the function in the user-intended style.

Second Embodiment

Described below is an example of adopting the present invention as the second embodiment by including spooling means of a job on a printing device.

In the present embodiment, large capacity memory such as an HD is loaded into the printing device as the external memory 14, and it is assumed that the drawing information of one job can be stored in the external memory 14.

In the above-mentioned condition, collate-printing can be realized by continuously accepting a collate set number designation print command after printing one set.

Figures 8, 8A:
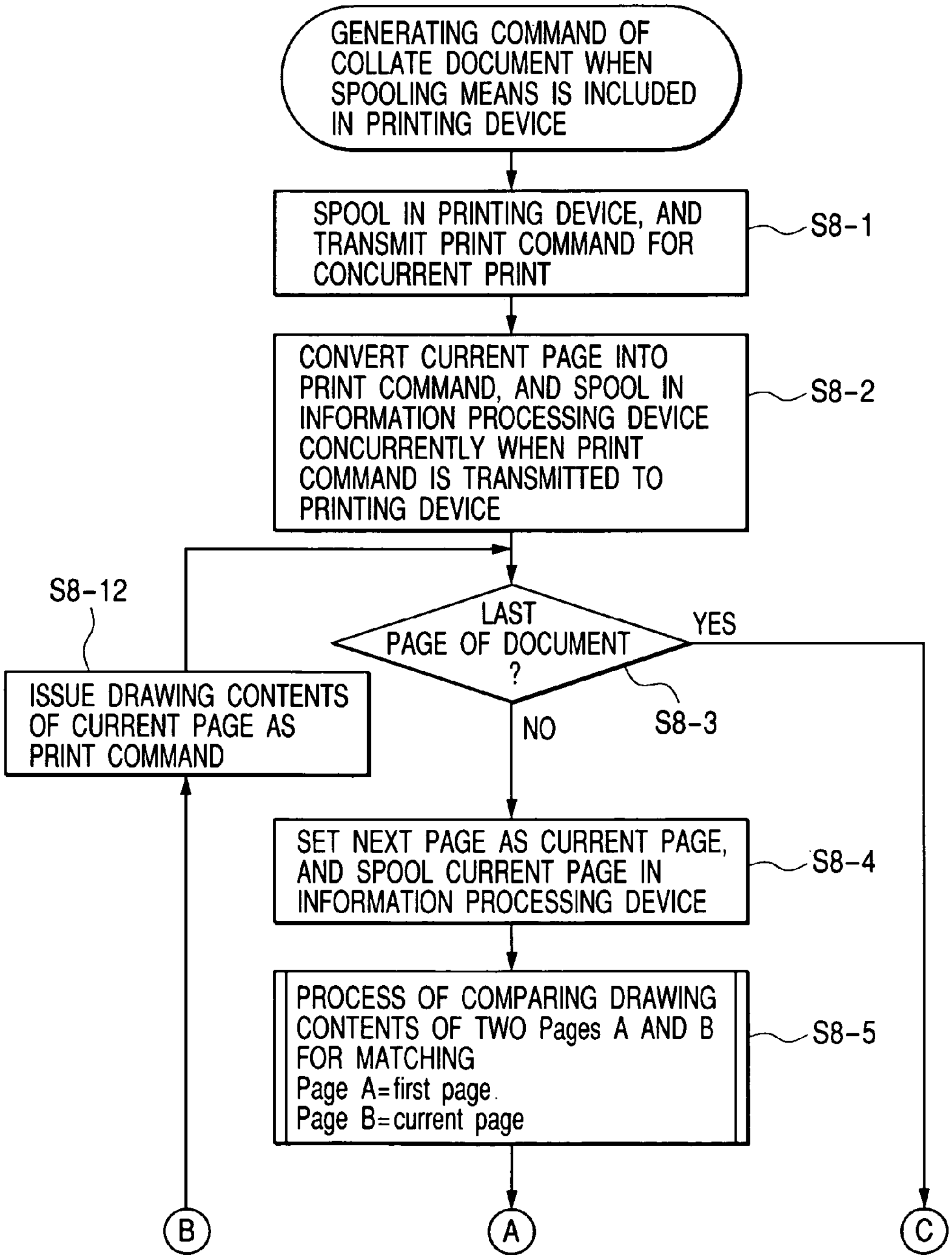
FIG. 8 which is composed of FIGS. 8A and 8B are flowcharts of an example of the fourth data processing procedure by a printing control system according to the present invention.
Figure 8B:
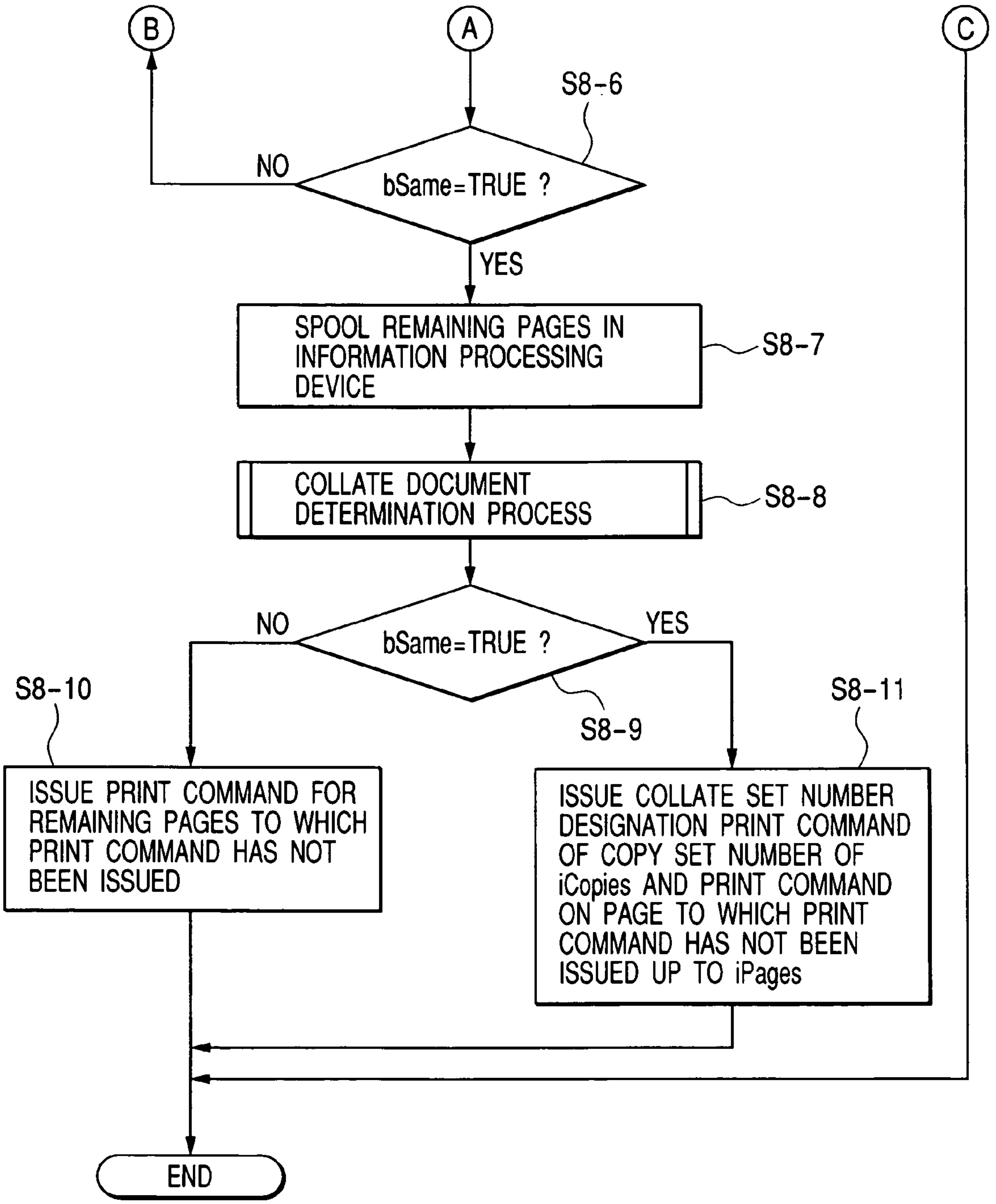

FIGS. 8A and 8B are a flowchart of an example of the fourth data processing procedure by a printing control system according to the present invention, and corresponds to the collate document command generation process procedure by the information processing device when spooling means of a job on a printing device is included. In this process, a spooling process and an issue of a print command are concurrently performed in the information processing device so that the printing start time cannot be delayed when the document is not a collate document.

In step 8-1, the drawing contents on a page are spooled on the printing device, and concurrently a print command to specify the style of the printing process to print the contents on recording paper is generated and issued by the information processing device. In step 8-2, the drawing contents of the current page are converted into a print command and transmitted to the printing device. Simultaneously, the drawing contents of the current page are spooled in the information processing device.

Then, in step 8-3, it is determined whether or not the current page is the last page of the document. If it is determined that the current page is the last page, then the process terminates immediately.

In step 8-3, if it is determined that the current page is not the last page, in step 8-4, the drawing contents of the current page are converted into a print command and transmitted to the printing device with the next page set as the current page. Simultaneously, the drawing contents of the current page are spooled in the information processing device.

Then, in step 8-5, a comparing process of checking whether the drawing contents of the first page and the current page are the same contents, and checking whether or not the drawing contents of the two pages shown in FIG. 5 are the same contents is performed. In step 8-6, it is determined whether or not the flag bSame is "TRUE", that is, the contents of the flag bSame indicating whether the drawing contents of the two pages are the same are checked.

In this example, if the variable bSame contains "TRUE", and it is determined that the two pages have the same contents, then control is passed to step 8-7. If the flag bSame is "FALSE", and the two pages are different, control is passed to step 8-12.

In step 8-7, the remaining pages of the document are converted into a print command, and transmitted to the printing device. Simultaneously, the drawing contents of the page are spooled in the information processing device.

Then, in step 8-8, the collate document determination process shown in FIG. 6 is performed on all pages of the spooled document. The number of transmitted pages is stored in step 8-7, and it is possible to place the restriction that the factors smaller than the number of the page are not checked.

Then, in step 8-9, the flag bSame indicating whether or not the document is a collate document is checked. If the flag bSame is "TRUE", and determines that the contents is a collate document, control is passed to step 8-10. If the flag bSame is "FALSE", the document is not a collate document, then control is passed to step 8-11.

In step 8-10, since the document is a collate document, a collate set number designation print command of the variable iCopies indicating the number of sets of copies, and a print command for drawing a page to which a print command has not been issued up to the variable iPages are issued, thereby terminating the process.

In step 8-11, the document is not a collate document, a print command for drawing a page to which a print command has not been issued is issued, thereby terminating the process.

On the other hand, if it is determined in step 8-6 that the flag bSame is "FALSE", then a print command indicating the drawing contents of the current page is issued in step 8-12, and control is returned to step 8-3.

Before performing the complete collate document process in the above-mentioned process, only the process of comparing with the first page is performed. By performing the simple comparison for several pages on and after the second page, the delay by a transfer to a complete comparison made when the document is not a collate document can be suppressed.

In the above-mentioned process, only a print command for a page forming a part of a collate document is transmitted to a printing device by the application 201. Therefore, the function of adapting a plurality of logical pages specified by a user to a sheet of output paper can be realized in a user-intended style on the printing device.

When the above-mentioned function is realized in the information processing device, the function can be realized in the user-intended style by applying the function specified by the user while each print command is being issued.

For example, in the case of N-up, it can be realized by generating a print command while a plurality of logical pages are reduced in specified positions on a page.

Third Embodiment

Described below is an example of applying the present invention when a printing device does not support collate-printing, or when a user does not intend to perform collate-printing on a printing device.

In this case, first, the boundary of a set of a collate document is determined in the determination method shown in FIG. 7 or 8 without issuing a collate set number designation print command. Then, when all page drawing contents of a document are issued as a print command, the function of printing a plurality of logical pages on one output medium is considered, and a print command is provided with the following devices such that page drawing can be separated in set units.

In the present embodiment, taking into consideration the function of printing a plurality of logical pages on one output medium as the first method of separating in set units, a blank page is added, and a print command for one output medium in set units can be separated for one output medium such that the function of separating can be realized in set units.

When blank paper saving function is applied on a printing device, a print command to disable the blank paper saving function is issued. For example, when simplex N-up printing is performed, a blank page is added at the end of the set by N−(iPages%N). IPages%N indicates a remainder as a result of dividing the variable iPages indicating the number of pages forming a set by N.

Furthermore, as the second method, if a printing device can receive a print command to specify the total number of pages of the logical pages arranged on one output medium, then the print command can be separated in set units by issuing a command to the set boundary page only.

As the third method, a job is generated for each set, and a print command for forming a job in set units is issued. In this case, since one document is divided into a plurality of jobs, it is necessary to provide a system capable of trailing divided jobs to perform a management process such as cancellation, accounting, etc.

When a print command for forming one page of a plurality of logical pages in an information processing device is processed, the segment of a set unit is considered in performing processing.

Fourth Embodiment

In the practical example 1 above, the collate-printing is performed mechanically using an eject bins, without spooling a job in a printing device. Therefore, issuing the collate set number designation print command from an information processing device to a printing device before passing the print command for drawing on a page is passed to a printing device is described above. That is, allotting a set is performed using a plurality of ejection bins 717 to 720 each time a copy is made, and the recording paper is ejected. However, the bins can also be specified by the user. The embodiment is described below.

PRACTICAL EXAMPLE 2

Described below is an example of applying the present invention when no spooling means is used in a job on a printing device.

In the case of the practical example, when a print command for one page is received on a printing device, copies are made in specified set units. Each time a copy is made, it is allotted to each of the ejection bins 717 to 720, and the recording paper is ejected. The operation realizes the collate-printing.

In this case, a job is not spooled in a printing device, but the collate-printing is performed mechanically using ejection bins. As a result, it is necessary to issue a collate set number designation print command from an information processing device to a printing device before passing the print command for drawing on a page to the printing device.

Figure 9:
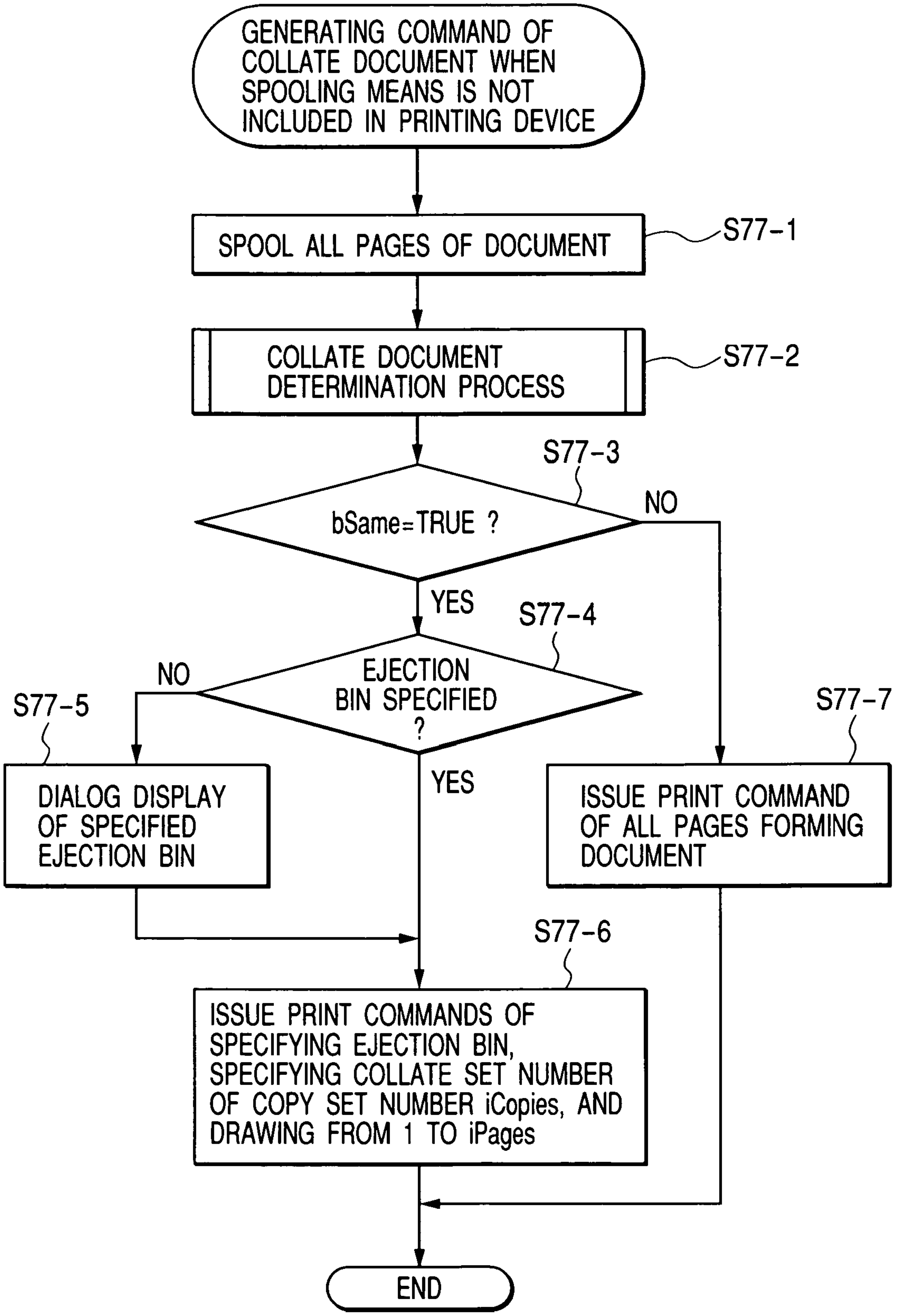
FIG. 9 is a flowchart of an example of the fifth data processing procedure by a printing control system according to the present invention.

FIG. 9 is a flowchart of an example of the fifth data processing procedure by a printing control system according to the present invention, and corresponds to the collate document command generation process procedure on a information processing device when no job spooling means is included in a printing device. Steps 77-1 to 77-7 indicates the respective process steps.

First, in step 77-1, the contents of all pages forming a document are spooled in the iteration process. Then, in step 77-2, the collate document determination process described above by referring to FIG. 6 is performed.

In step 77-3, it is determined whether or not the document is a collate document by checking the contents of the variable (flag) bSame. If it is determined that the flag bSame is "TRUE", then control is passed, to step 77-4. If the flag bSame is "FALSE", then control is passed to step 77-7.

In step 77-4, it is determined whether or not an ejection bin is specified. If it is determined that an ejection bin has been specified, then control is passed to step 77-6. If an ejection bin is specified, then an ejection bin designation print command, a collate set number designation print command of the number of sets of copies, and a print command for drawing a page from the first page to the iPages page are issued from the spooled intermediate data, thereby terminating the process.

On the other hand, if it is determined that there is no ejection bin specified in step 77-4, then the user is notified of a collate document in step 77-5, a dialog requesting a destination as to whether or not an ejection bin is specified is displayed. If the user specifies an ejection format, control is passed to step 77-6.

In step 77-7, a print command for drawing all pages forming a document is issued using the spooled intermediate data, thereby terminating the process.

Fifth Embodiment

In the fifth embodiment, as in the second embodiment, an example of applying the present invention when spooling means is used in a job on a printing device is described, and the designation of an ejection bin is specifically considered.

In the present embodiment, large storage capacity memory such as an HD, etc. is loaded into a printing device as the external memory 14, and it is assumed that drawing information about one job can be stored.

Under the above-mentioned condition, collate-printing can be performed by receiving a collate set number designation print command continuously after printing one set.

Figures 10, 10A:
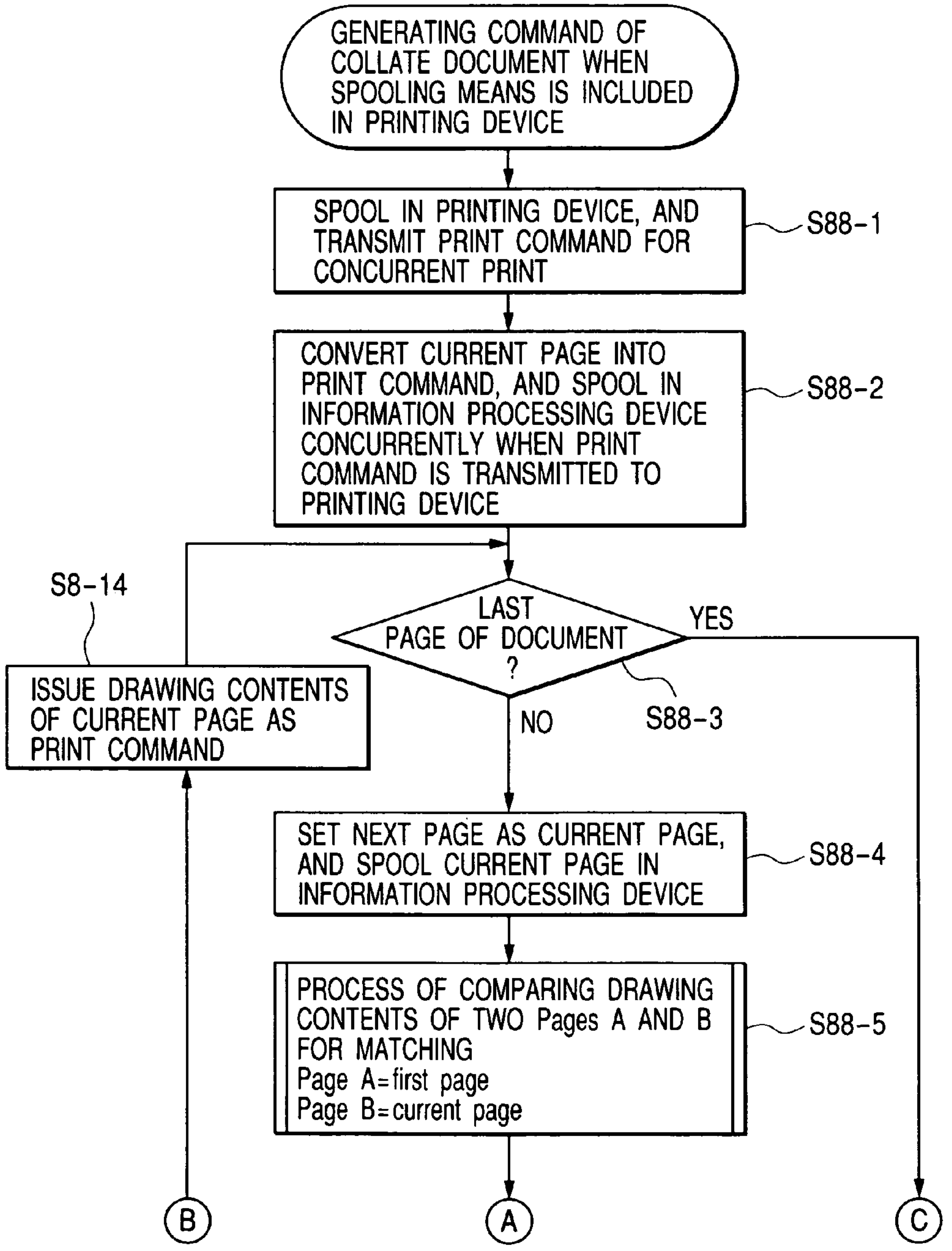
FIG. 10 which is composed of FIGS. 10A and 10B are flowcharts of an example of the sixth data processing procedure by a printing control system according to the present invention.
Figure 10B:
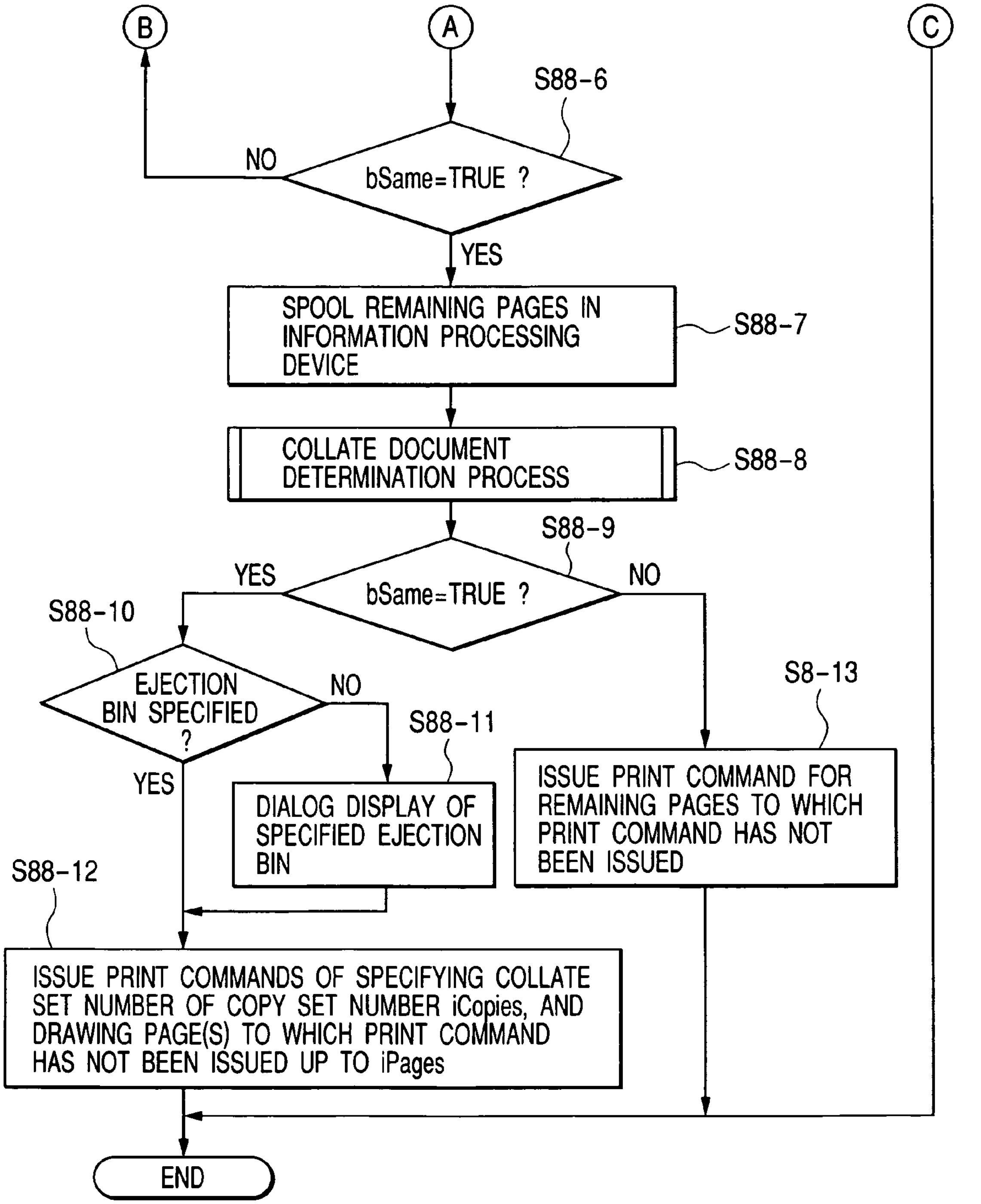

FIGS. 10A and 10B are a flowchart of an example of the sixth data processing procedure by a printing control system according to the present invention, and corresponds to the collate document command generation process procedure in the information processing device when spooling means of a job is included in the printing device. In this process, the spooling process and issuing a print command in the information processing device are performed concurrently so that the delay of the print starting time cannot be deleted when the document is not a collate document. Steps 88 to 14 respectively indicate each process step.

First, in step 88-1, the drawing contents on a page is spooled on a printing device, and simultaneously a print command for specifying the printing style in printing the contents on recording paper is generated and issued. Then, in step 88-2, the drawing contents of the current page are converted into a print command and transmitted to a printing device, and concurrently the drawing contents of the current page are spooled in the information processing device.

In step 88-3, it is determined whether or not the current page is the last page of the document. If it is the last page, the process terminates.

In step 88-3, if it is determined that the current page is not the last page of the document, in step 88-4, then the next page is set as the current page, the drawing contents of the current page are converted into a print command, and are transmitted to a printing device, and concurrently the drawing contents of the current page are spooled in the information processing device in step 88-4.

In step 88-5, a comparing process of checking whether the drawing contents of the first page and the current page are the same contents, and checking whether or not the drawing contents of the two pages shown in FIG. 5 are the same contents is performed. In step 8-6, it is determined whether or not the flag bSame is "TRUE", that is, the contents of the flag bSame indicating whether the drawing contents of the two pages are the same are checked.

In this example, if the variable bSame contains "TRUE", and it is determined that the two pages have the same contents, then control is passed to step 88-7. If the flag bSame is "FALSE", and the two pages are different, control is passed to step 88-14.

In step 88-7, the remaining pages of the document are converted into a print command, and transmitted to the printing device. Simultaneously, the drawing contents of the page are spooled in the information processing device.

Then, in step 88-8, the collate document determination process shown in FIG. 6 is performed on all pages of the spooled document. The number of transmitted pages is stored in step 88-7, and it is possible to place the restriction that the factors smaller than the number of the page are not checked.

Then, in step 88-9, the flag bSame indicating whether or not the document is a collate document is checked. If the flag bSame is "TRUE", and determines that the contents is a collate document, control is passed to step 88-10. If the flag bSame is "FALSE", the document is not a collate document, then control is passed to step 8-13.

In step 88-10, it is determined whether or not an ejection bin is specified. If it is determined that an ejection bin has been specified, then control is passed to step 88-12. If an ejection bin is specified, then an ejection bin designation print command, a collate set number designation print command of the number of sets of copies, and a print command for drawing a page from the first page to the iPages page are issued from the spooled intermediate data, thereby terminating the process.

On the other hand, if it is determined that there is no ejection bin specified in step 88-10, then the user is notified of a collate document in step 88-11, a dialog requesting a destination as to whether or not an ejection bin is specified is displayed. If the user specifies an ejection format, control is passed to step 88-12.

In step 88-13, the document is not a collate document, a print command for drawing a page to which a print command has not been issued is issued, thereby terminating the process.

On the other hand, if it is determined in step 88-6 that the flag bSame is "FALSE", then a print command indicating the drawing contents of the current page is issued in step 8-14, and control is returned to step 88-3.

Before performing the complete collate document process in the above-mentioned process, only the process of comparing with the first page is performed. By performing the simple comparison for several pages on and after the second page, the delay by a transfer to a complete comparison made when the document is not a collate document can be suppressed.

The data processing program readable by the information processing device according to the present invention is described below by referring to the memory map shown in FIG. 11.

Figure 11:
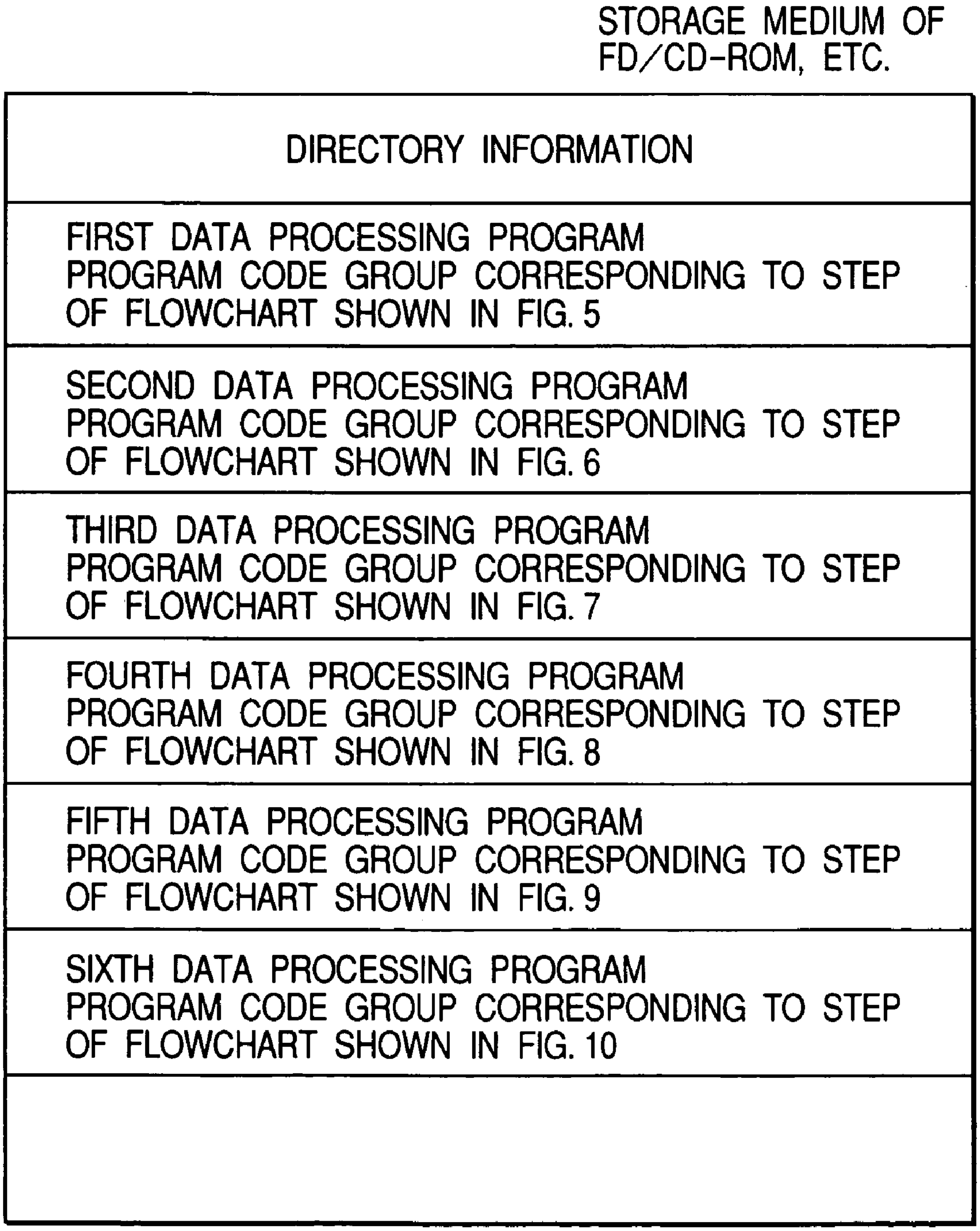
FIG. 11 is an explanatory view of a memory map of a storage medium storing various data processing programs readable by an information processing device according to the present invention.
Figure 12:
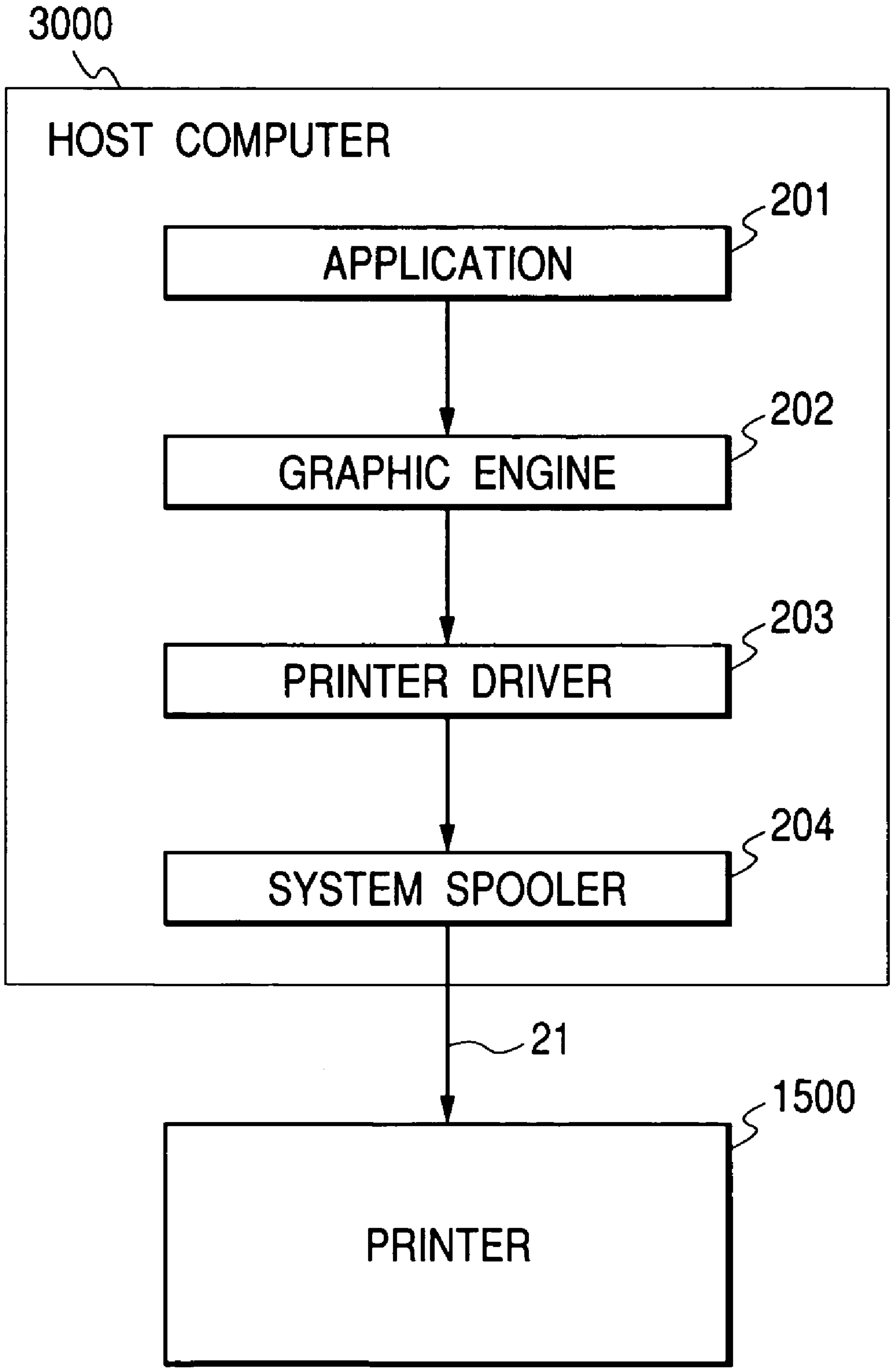
FIG. 12 is a block diagram for explanation of a data processing system in a conventional printing system.
Figure 13:
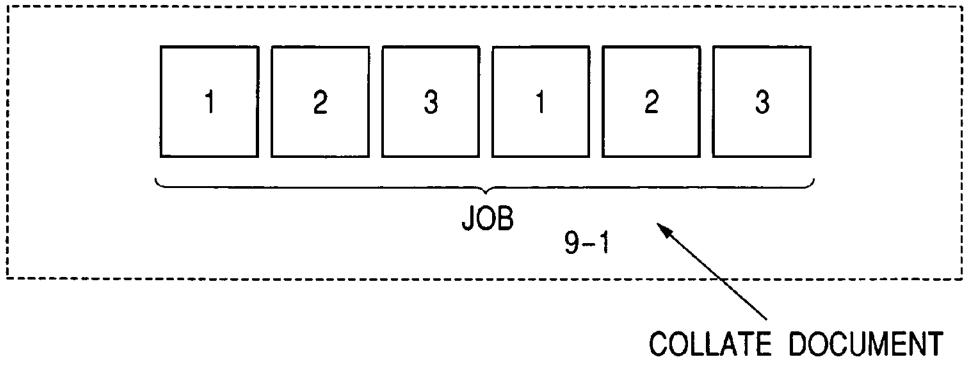
FIG. 13 is an explanatory view of an example of collate-printing on a job in the above-mentioned printing system.
Figure 14:
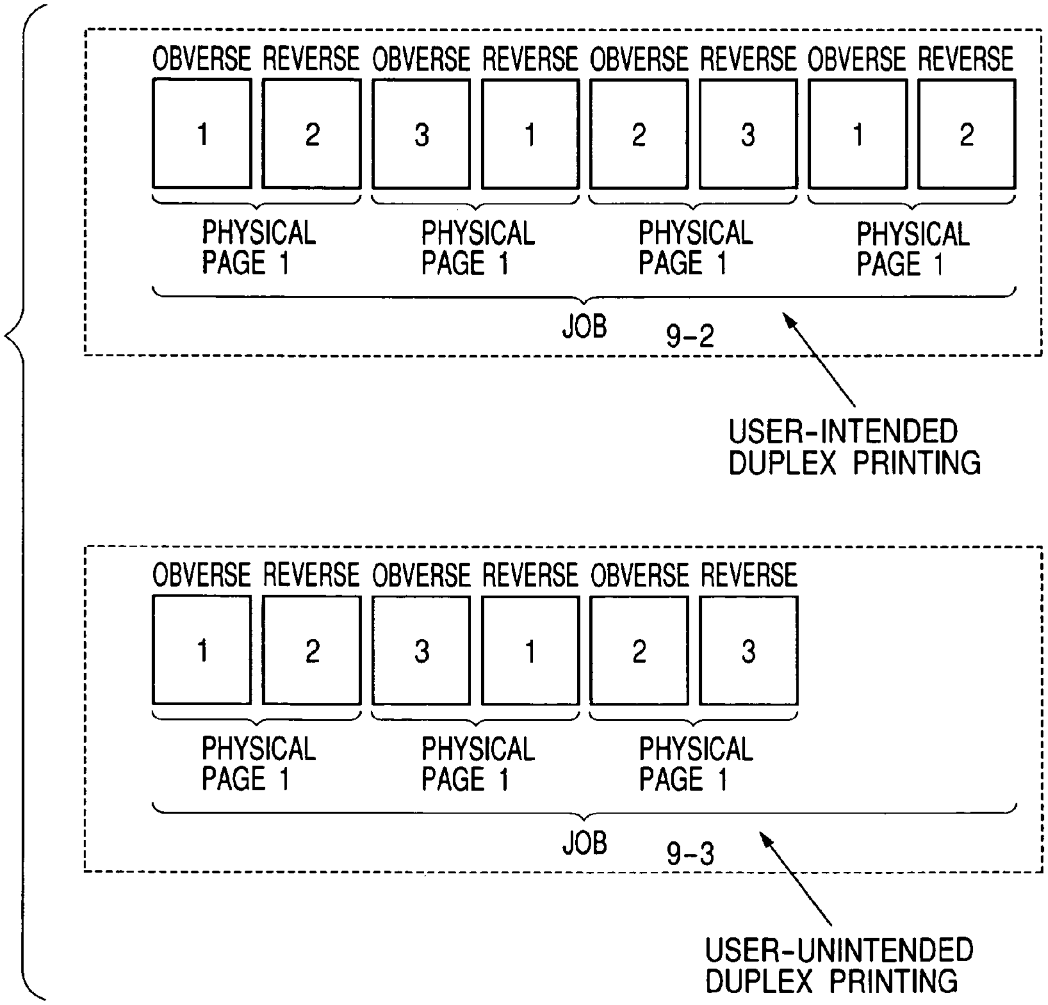
FIG. 14 is an explanatory view of an example of collate-printing on a job in the above-mentioned printing system.
Figure 15:
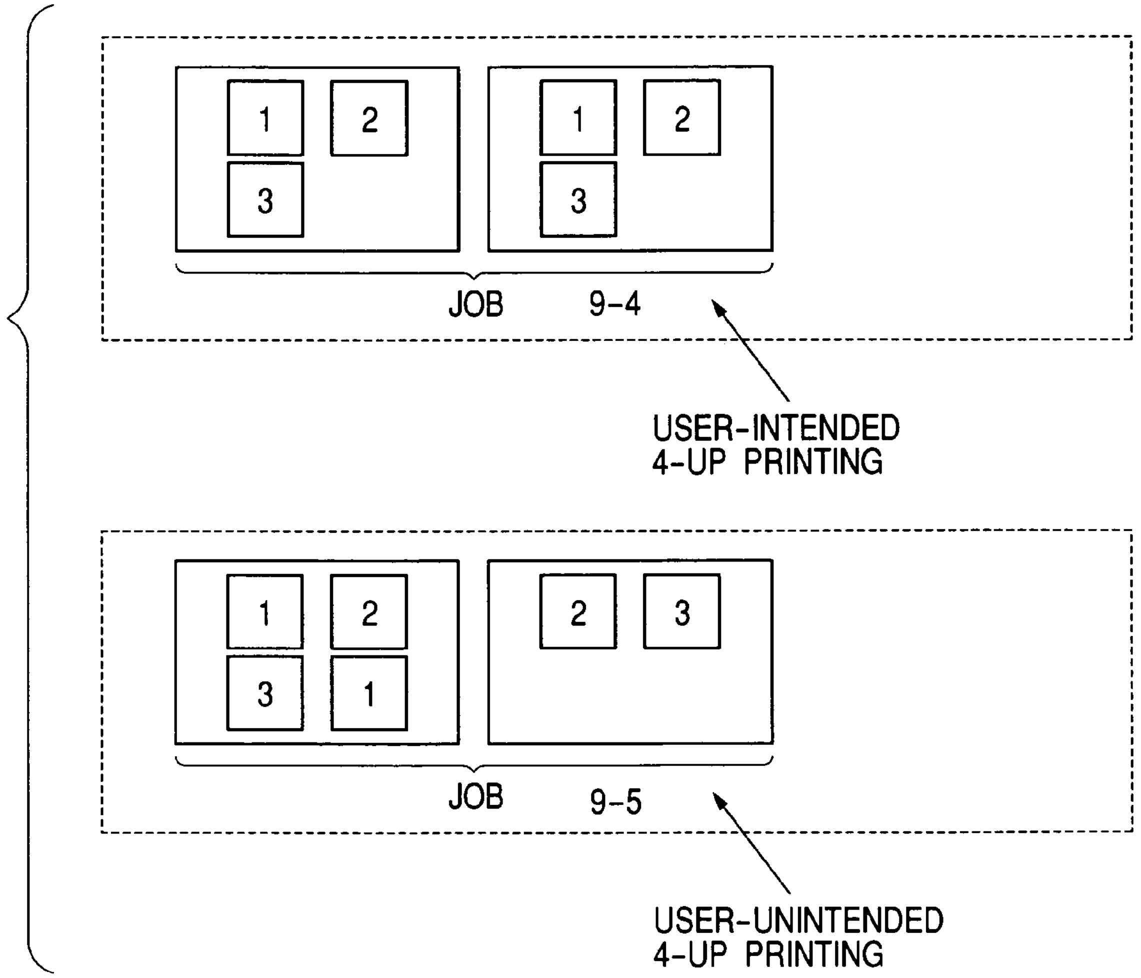
FIG. 15 is an explanatory view of an example of collate-printing on a job in the above-mentioned printing system.

FIG. 11 is an explanatory view of a memory map of a storage medium storing various data processing programs readable by an information processing device according to the present invention.

Although not shown in the attached drawings, the information for management of a program group stored in the storage medium, for example, version information, a generator, etc. is stored, and the information depending on the OS, etc. at a program reading side, for example, an icon for identification and display of a program, etc. can also be stored.

Furthermore, data belonging to various programs is also managed by the above-mentioned directory. A program for installing various programs into a computer, a program for decompressing a program when an installed program is compressed can also be stored.

The function shown in FIGS. 5 to 10 according to the present embodiment can also be realized by a host computer using a program externally installed. In this case, the present invention can be applied when an information group including a program is provided for an output device using a storage medium such as CD-ROM, flash memory, an FD, etc., or from an external storage medium through a network.

As described above, it is obvious that the purpose of the present invention can be attained by providing a system or a device with a storage medium storing a program code of software for realizing the function of the above-mentioned embodiment, and by the computer (or the CPU or the MPU) of the system or the device reading and executing the program code stored in the storage medium.

In this case, the program code itself read from the storage medium realizes the new function of the present invention, and the storage medium storing the program code configures the present invention.

The storage medium for providing a program code can be, for example, a flexible disk, a hard disk, an optical disk, a magneto-optical disk, CD-ROM, a magnetic tape, a non-volatile memory card, ROM, EEPROM, etc.

Furthermore, by executing a program code read by a computer, not only the above-mentioned function of the embodiment can be realized, but also a part or all of the actual process is performed by the OS (operating system), etc. operating on the computer at an instruction of the program code, and the above-mentioned function of the embodiment can be realized by the process.

Additionally, it is obvious that, the program code read from the storage medium is written to a memory of the feature expansion board inserted into a computer or the feature expansion unit connected to a computer, and then at an instruction of the program code, the CPU, etc. of the feature expansion board and the feature expansion unit performs a part or all of the actual processes, and the processes can also realize the above-mentioned functions of the embodiment.

The present invention is not limited to the above-mentioned embodiments, variations (including organic combinations of the embodiments) can be realized based on the gist of the present invention, and are not excluded from the scope of the present invention.

Various application examples and embodiments have been explained above, and one skilled in the art is not limited to the specific explanation in the specifications, but includes the following application examples. The application examples 1 to 24 are described below.

APPLICATION EXAMPLE 1

A data processing apparatus for transferring to a printing device a document formed by a plurality of logical pages generated by an application, and allowing the printing device to perform a printing process in set units, including: spooling means (for example, a spooler 302 and a spool file 303 shown in FIG. 4) for spooling the document; designation means (for example, an application 201 shown in FIG. 4) for designating a printing mode for output of a plurality of logical pages to one storage medium; collate determination means (for example, a spool file manager 304 shown in FIG. 4) for determining whether or not the document is a collate document to be printed in plural set units by comparing drawing information among the logical pages of the document spooled in the spooling means when the designation means designates the printing mode; detection means for comparing drawing information among logical pages in the spooled document when the collate determination means determines that the document is a collate document, and detecting the number of pages as a segment of a set unit; and control means (for example, a printer driver 203 shown in FIG. 4) for controlling a set-unit transfer process on drawing information for the printing device depending on the segment of a set unit detected by the detection means.

APPLICATION EXAMPLE 2

The data processing apparatus according to application example 1, wherein a printing mode which can be specified by the designation means includes a double-sided printing mode for printing drawing information on both sides of a storage medium, and a N-up printing mode for outputting a plurality of logical pages on the storage medium.

APPLICATION EXAMPLE 3

The data processing apparatus according to application example 1, wherein when the collate document determination means determines whether or not the current document is a collate-formatted document, the size of data on each page stored by the spooling means is compared, and it is determined whether or not contents are different.

APPLICATION EXAMPLE 4

The data processing apparatus according to application example 1, wherein when the collate document determination means determines whether or not the current document is a collate-formatted document, a spool code of each page is sampled and compared, thereby determining a page containing different contents.

APPLICATION EXAMPLE 5

The data processing apparatus according to application-example 1, wherein when the collate document determination means determines whether or not the current document is a collate-formatted document, all data in a spool code of each page is compared as a method of determining pages completely matching in contents, thereby determining matching pages in contents.

APPLICATION EXAMPLE 6

The data processing apparatus according to application example 1, wherein when a printing device can perform collate-printing, there is no means for spooling a print command, and it is necessary to transmit a collate set number designation print command at the beginning of a job, all pages in the job are temporarily spooled and then the collate document determination means makes a determination, when the print command generation means generates a collate set number designation print command and a part of leading print commands, the collate document determination means obtains a factor (including 1) of a total number of pages forming a document, segments a document for each factor, and determines drawing contents whether or not a collate-format page configuration is established.

APPLICATION EXAMPLE 7

The data processing apparatus according to application example 1 wherein a printing device includes spooling means of a print command, when it is not necessary to transmit a collate set number designation print command to the beginning of the job, the spooling means stores drawing information for each means, the collate document determination means determines immediately after storing a page other than the first page whether or not it contains the same contents as the first page, a print command of the page is generated and transferred to the printing device until the page including the same drawing contents as the first page can be detected, when a page including the same drawing contents as the first page is detected, the collate document determination means determines whether or not the current document if a collate document all through the job in and after the page, if it is a collate document, a collate set number designation print command is generated, and collate-printing is performed on a printing device.

APPLICATION EXAMPLE 8

The data processing apparatus according to application example 1, wherein when a printing device does not perform collate-printing, a collate document is divided as a plurality of print commands in set units and transferred to a printing device.

APPLICATION EXAMPLE 9

The data processing apparatus according to application example 8, wherein a blank page is added such that a function can be divided in set units with a function of printing a plurality of logical pages on one output medium taken into account so that a print command can be divided in set units.

APPLICATION EXAMPLE 10

The data processing apparatus according to application example 9, wherein when a printing device has a blank paper saving function, a print command to disable a blank paper saving function is issued.

APPLICATION EXAMPLE 11

The data processing apparatus according to application example 8, wherein a set-unit print command can be divided by issuing a command to specify a page number of a logical page arranged on one output medium.

APPLICATION EXAMPLE 12

The data processing apparatus according to application example 8, wherein a set-unit print command can be divided by dividing a job in set units.

APPLICATION EXAMPLE 13

The data processing apparatus according to application example 1 wherein when a function of printing a plurality of logical pages on one output medium is applied at an information processing device side, a function of printing a plurality of logical pages on one output medium with a segment of a set unit in a collate document taken into account.

APPLICATION EXAMPLE 14

The data processing apparatus according to application example 1, further including: print command generation means for generating a print command for printing one set when the collate determination means determines that the document is a collate document; and bin configuration determination means (for example, a spool file manager 304 shown in FIG. 4) for determining whether or not the printing device has a plurality of output bins, wherein the print command generation means generates an output bin designation print command for specifying output of a different output bin for each set when the bin configuration determination means determines a plurality of output bins.

APPLICATION EXAMPLE 15

The data processing apparatus according to application example 1, wherein the collate determination means obtains the factors of the number of pages forming a job, segments the job for each factor, and determines according to drawing information whether or not a page configuration is in a collate format.

APPLICATION EXAMPLE 16

The data processing apparatus according to application example 14, wherein the print command generation means temporarily stores all pages of a job when the printing device has no function of spooling a print command, and then generates a collate set number designation print command.

APPLICATION EXAMPLE 17

The data processing apparatus according to application example 14, further including collate function applicability determination means (for example, a spool file manager 304 shown in FIG. 4) for determining whether or not the printing device can perform a collate-printing function or whether or not there is a collate-printing function, wherein when it is determined that the collate-printing is not applicable, or when the collate-printing function is not available, the spooling process is not performed, and a generated print command is transferred to a printing device.

APPLICATION EXAMPLE 18

The data processing apparatus according to application example 17, further including position determination means (for example, a spool file manager 304 shown in FIG. 4) for determining the possible issue position in a job to which a collate set number designation print command can be issued when the collate function applicability determination means determines that the printing device can perform a collate-printing function.

APPLICATION EXAMPLE 19

A job processing method for use with a data processing apparatus which has spooling means for spooling a document and transfers to a printing device a document formed by plurality of logical pages generated by an application to allow the printing device to perform a printing process in set units, including: a designating step (not shown in the attached drawings) of designating a printing mode for output of a plurality of logical pages to one storage medium; a collate determining step (for example, step 6-6 shown in FIG. 6) of determining whether or not the document is a collate document to be printed in plural set units by comparing drawing information among the logical pages of the document spooled in the spooling means when the designation means designates the printing mode; a detecting step (for example, step 6-12 shown in FIG. 6) of comparing drawing information among logical pages in the spooled document when the collate determination means determines that the document is a collate document, and detecting the number of pages as a segment of a set unit; and a controlling step (for example, step 7-4 shown in FIG. 7) of controlling a set-unit transfer process on drawing information for the printing device depending on the segment of a set unit detected by the detection means.

APPLICATION EXAMPLE 20

The job processing method according to application example 19, further including: a print command generating step of generating a print command for printing one set when the collate determining step determines that the document is a collate document; and a bin configuration determining step (for example, step 77-4 shown in FIG. 9) of determining whether or not the printing device has a plurality of output bins, wherein the print command generating step generates an output bin designation print command for specifying output of a different output bin for each set (for example, step 77-6 shown in FIG. 9) when the bin configuration determining step determines a plurality of output bins.

APPLICATION EXAMPLE 21

The job processing method according to application example 19, further including a collate function applicability determining step (for example, step 77-3 shown in FIG. 9) for determining whether or not the printing device can perform a collate-printing function or whether or not there is a collate-printing function, wherein when it is determined that the collate-printing is not applicable, or when the collate-printing function is not available, the spooling process is not performed, and a generated print command is transferred to a printing device (for example, step 77-7 shown in FIG. 9).

APPLICATION EXAMPLE 22

The job processing method according to application example 21, further including position determining step of determining the possible issue position in a job to which a collate set number designation print command can be issued when the collate function applicability determining step determines that the printing device can perform a collate-printing function.

APPLICATION EXAMPLE 23

A computer-readable storage medium storing a program for realizing the job processing method according to any of application examples 19 to 22.

APPLICATION EXAMPLE 24

The program for realizing the job processing method according to any of application examples 19 to 22.

As many apparently widely different embodiments of the present invention can be made without departing from the spirit and scope thereof, it is to be understood that the invention is not limited to the specific embodiments thereof except as defined in the appended claims.

According to application examples 1 to 24, a segment of a set unit in a collate document generated by an application can be determined, and a segment of a set unit can be realized when a plurality of logical pages are printed on one output medium in N-up printing, double-sided printing, etc.

When a document formed by three logical pages is printed in a 2-unit collate-printing operation in an application, only a collate set number designation print command is to be transferred without repeating the transfer of the same command, thereby reducing the load of performing a transfer process in the printing operation.

Furthermore, when a printing device has a plurality of ejection bins, and enables output to different ejection bins in set units, the ejection bins can be switched for each unit when a job is received, and printed paper can be ejected to a user specified ejection bin.

Additionally, when a printing device has a spooling capability, the one-unit print command and a collate set number designation print command can be held for conversion into an internal format which can be processed by hardware, thereby largely improving the printing efficiency much more than a process in which the same command is processed for each unit.

As described above, according to the present invention, a document formed by plurality of logical pages generated by an application is transferred to a printing device to allow the printing device to perform a printing process in set units. When a printing mode for output of a plurality of logical pages to one storage medium is specified, drawing information among the logical pages of the document spooled is compared to determine whether or not the document is a collate document to be printed in plural set units. When the collate determination means determines that the document is a collate document, drawing information among the logical pages of the document spooled is compared to detect the number of pages as a segment of a set unit, and a set-unit transfer process on drawing information for the printing device is controlled depending on the segment of a set unit. Therefore, although a printing mode for output of a plurality of logical pages to one storage medium is specified in response to a collate-printing request from an application, a less expensive job processing environment in which a printing result can be efficiently obtained with a correct segment of a set unit in a collate document can be realized.

What is claimed is:

1. A data processing apparatus for transmitting a document formed by a plurality of logical pages to a printing device, comprising:

spooling means for spooling the plurality of logical pages for each of a plurality of sets;

deriving means for deriving a number of logical pages from said spooling means, wherein the derived number of logical pages is fewer than an entirety of the spooled logical pages, and wherein the derived number of logical pages corresponds to values obtained by adding 1 (one) to numerical factors of a total number of the logical pages spooled by said spooling means;

retrieval means for retrieving, from among the derived number of logical pages derived by said deriving means, one logical page identical in drawing information to a first logical page;

determination means for determining drawing information from the first logical page to a logical page just previous to the one logical page retrieved by said retrieval means to be drawing information for one of the plurality of sets;

generation means for generating a print command to be transmitted to the printing device based on the drawing information for the one set determined by said determination means; and transmission means for transmitting the print command generated by said generation means to the printing device.

2. The data processing apparatus according to claim 1, further comprising designation means for designating a printing mode including a double-sided printing mode for printing drawing information on both sides of one print sheet, and a N-up printing mode for outputting a plurality of logical pages on a face of one print sheet, wherein said retrieval means retrieves the one logical page in response to designation of the printing mode.

3. The data processing apparatus according to claim 1, wherein said retrieval means retrieves the one logical page based on data sizes of the one logical page and the first logical page.

4. The data processing apparatus according to claim 1, wherein said retrieval means retrieves the one logical page by performing a sampling process on the one logical page and the first logical page.

5. The data processing apparatus according to claim 1, wherein said retrieval means retrieves the one logical page by comparing all spool codes for the first logical page with all spool codes for the remaining logical pages.

6. The data processing apparatus according to claim 1, wherein if the printing device cannot store the print command for the plurality of logical pages for each set, said generation means generates a print command indicating the number of the sets and a print command for printing the drawing information for the one set determined by said determination means.

7. The data processing apparatus according to claim 1, wherein if the printing device can store the print command for the plurality of logical pages for each set, said spooling means stores drawing information for each logical page, and said transmission means transmits the print command generated by said generation means until said retrieval means retrieves the one logical page to the printing device, and thereafter if the document is determined to be a collate document based on the logical pages subsequent to the retrieved one logical page, said transmission means transmits a print command indicating the number of the sets.

8. A job processing method for use with a data processing apparatus which transmits to a printing device a document formed by a plurality of logical pages the method comprising:

a spooling step of spooling the plurality of logical pages for each of a plurality of sets;

a deriving step of deriving a number of logical pages from said spooling step, wherein the derived number of logical pages is fewer than an entirety of the spooled logical pages, and wherein the derived number of logical pages corresponds to values obtained by adding 1 (one) to numerical factors of a total number of the logical pages spooled by said spooling step;

a retrieving step of retrieving, from among the derived number of logical pages derived by said deriving step, one logical page identical in drawing information to a first logical page;

a determining step of determining drawing information from the first logical page to a logical page just previous to the one logical page retrieved in said retrieving step to be drawing information for one of the plurality of sets;

a generating step of generating a print command to be transmitted to the printing device based on the drawing information for the one set determined in said determining step; and a transmitting step of transmitting the print command generated in said generating step to the printing device.

9. A data processing program stored on a computer-readable storage medium, the program being executed by a data processing apparatus so as to control the data processing apparatus to transmit to a printing device a document formed by a plurality of logical pages the program comprising:

a spooling step of spooling the plurality of logical pages for each of a plurality of sets;

a deriving step of deriving a number of logical pages from said spooling step, wherein the derived number of logical pages is fewer than an entirety of the spooled logical pages, and wherein the derived the number of logical pages corresponds to values obtained by adding 1 (one) to numerical factors of a total number of the logical pages spooled by said spooling step;

a retrieving step of retrieving, from among the derived number of logical pages derived by said deriving step, one logical page identical in drawing information to a first logical page;

a determining step of determining drawing information from the first logical page to a logical page just previous to the one logical page retrieved in said retrieving step to be drawing information for one of the plurality of sets;

a generating step of generating a print command to be transmitted to the printing device based on the drawing information for the one set determined in said determining step; and a transmitting step of transmitting the print command generated in said generating step to the printing device.

* * * * *